United States Patent [19]

Mizuma et al.

[11] Patent Number: 4,933,727

[45] Date of Patent: Jun. 12, 1990

[54] COLOR RECORDING APPARATUS

[75] Inventors: Kenichi Mizuma; Yutaka Koizumi; Hideya Furuta, all of Yokohama; Mitsuru Mamizuka, Tokyo; Katsuo Sakai, Yokohama; Yoshihiro Sakai, Tokyo; Noriyuki Kimura, Kawasaki; Kazunori Bannai, Yokohama; Kazushige Taguchi, Ageo, all of Japan

[73] Assignee: Ricoh Company, Ltd., Tokyo, Japan

[21] Appl. No.: 330,706

[22] Filed: Mar. 30, 1989

[30] Foreign Application Priority Data

| Mar. 31, 1988 | [JP] | Japan | 63-78668 |
| Mar. 31, 1988 | [JP] | Japan | 63-78669 |
| Apr. 6, 1988 | [JP] | Japan | 63-83102 |
| Apr. 9, 1988 | [JP] | Japan | 63-88004 |
| Apr. 9, 1988 | [JP] | Japan | 63-88005 |

[51] Int. Cl.$^5$ ............................................. G03G 15/01
[52] U.S. Cl. .................................. 355/327; 355/272; 355/309; 355/212
[58] Field of Search .............. 355/327, 326, 272, 308, 355/309, 212; 346/157

[56] References Cited

U.S. PATENT DOCUMENTS

| 4,082,443 | 4/1978 | Draugelis et al. | 355/212 X |
| 4,101,067 | 7/1978 | Sloan et al. | 228/222 |
| 4,697,920 | 10/1987 | Palm et al. | 355/212 X |
| 4,788,572 | 11/1988 | Slayton et al. | 355/326 X |
| 4,847,660 | 7/1989 | Wheatley et al. | 355/326 X |
| 4,849,795 | 7/1989 | Spehrhley et al. | 355/327 X |

Primary Examiner—R. L. Moses
Attorney, Agent, or Firm—Oblon, Spivak, McClelland, Maier & Neustadt

[57] ABSTRACT

A color recording apparatus has an electric charge carrier which is circulatingly movable, an electrostatic latent image forming unit for forming a latent image which corresponds to an original image on the carrier, a development unit for developing the latent image; a transfer unit for transferring the developed image formed on the carrier to a record paper in a transfer process, a conveyor for conveying the record paper forward and backward with respect to the transfer unit, and a control unit which repeats control operations for controlling the latent image forming unit to form a latent image on the carrier, for controlling the development unit to develop the latent image, for controlling the conveyor to convey the record paper forward, for controlling the transfer unit to transfer the developed image to the record paper, and for controlling the conveyor to convey the record paper backward at least for one time. The control unit controls the conveyor prior to the transfer process so that the record paper is positioned at a point which is a predetermined distance before a transfer point and that a forward movement of the record paper is started on the basis of an information signal which is output in response to a state of starting an electrostatic latent image forming operation each time the transfer process is carried out.

9 Claims, 17 Drawing Sheets

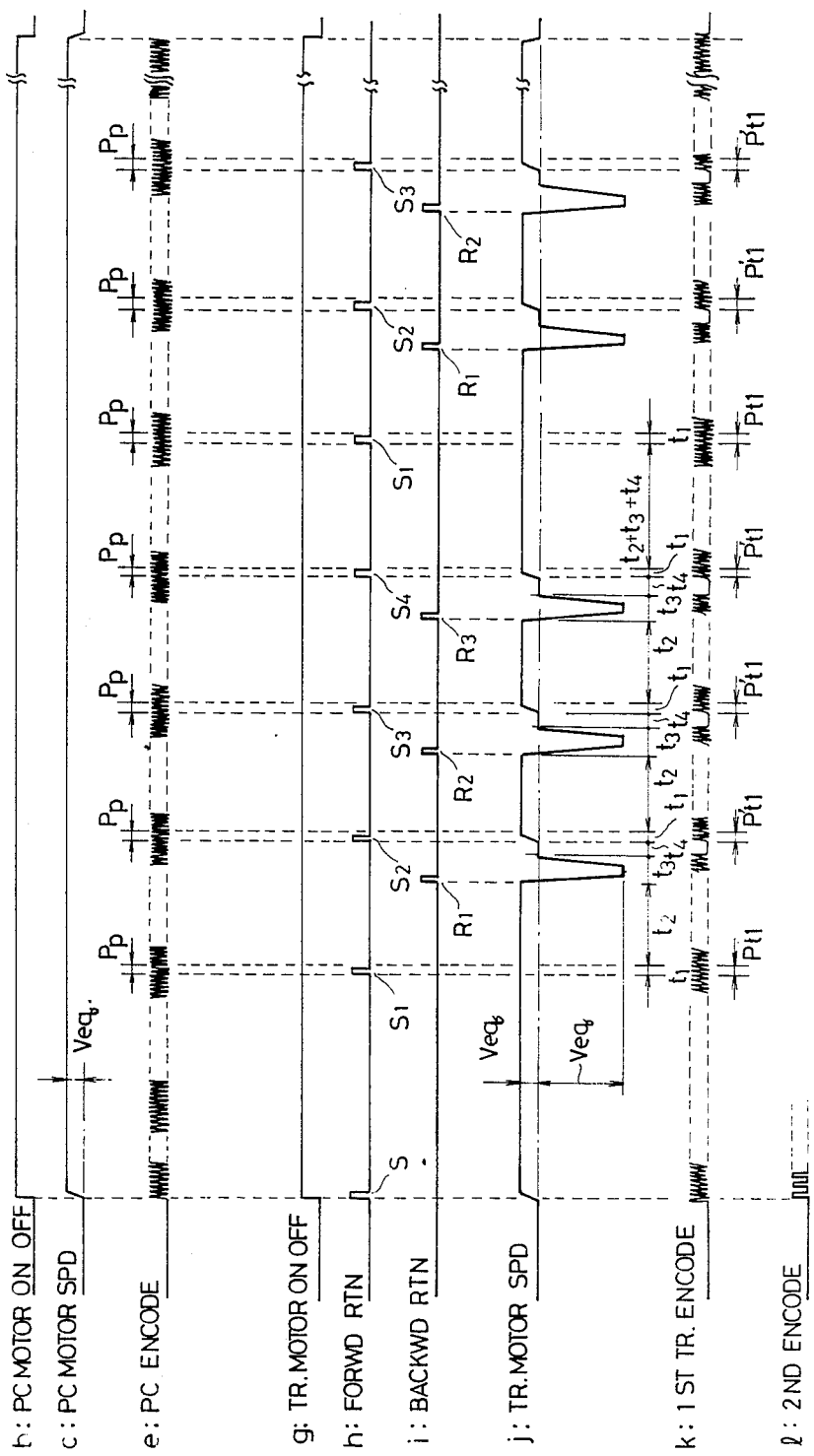

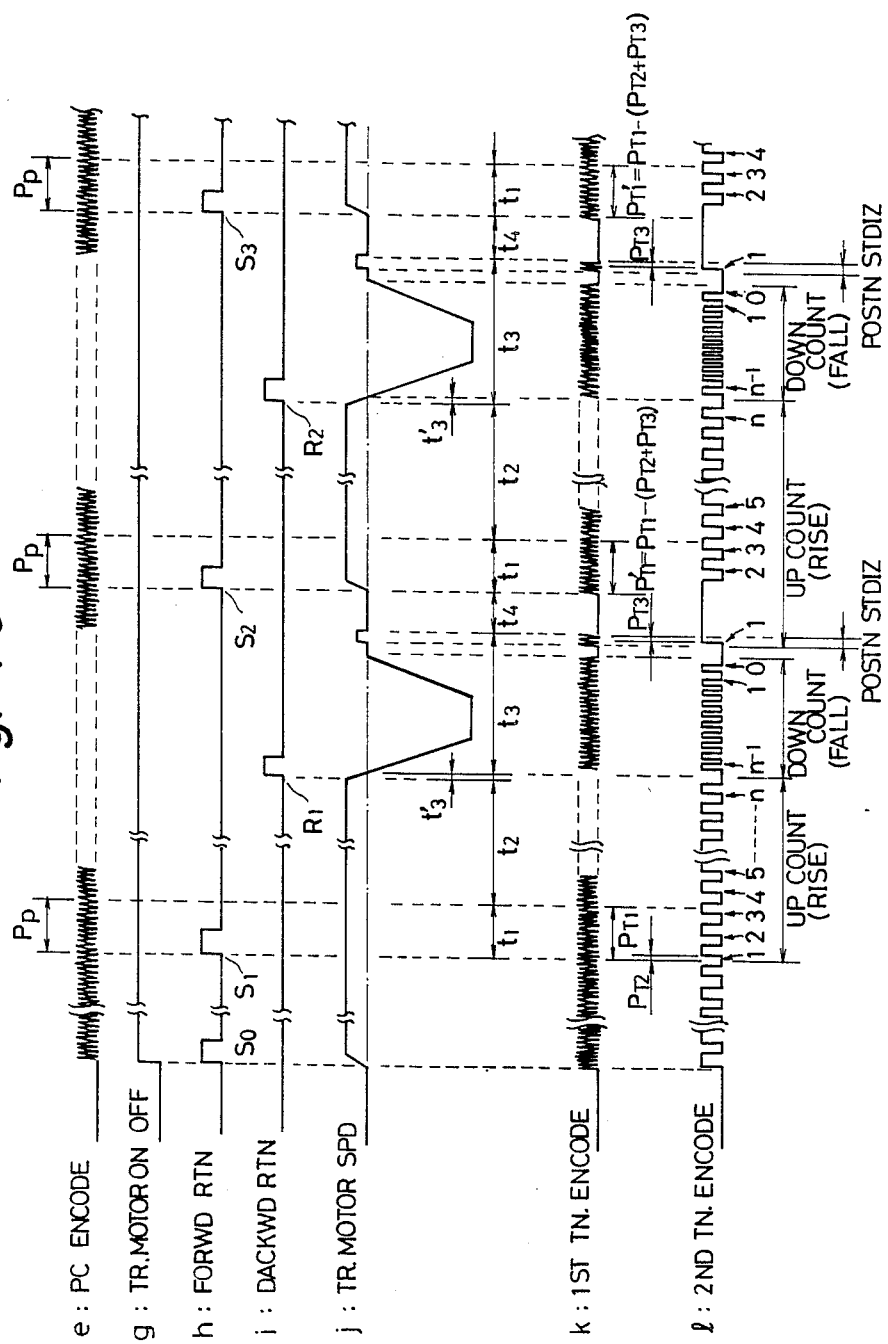

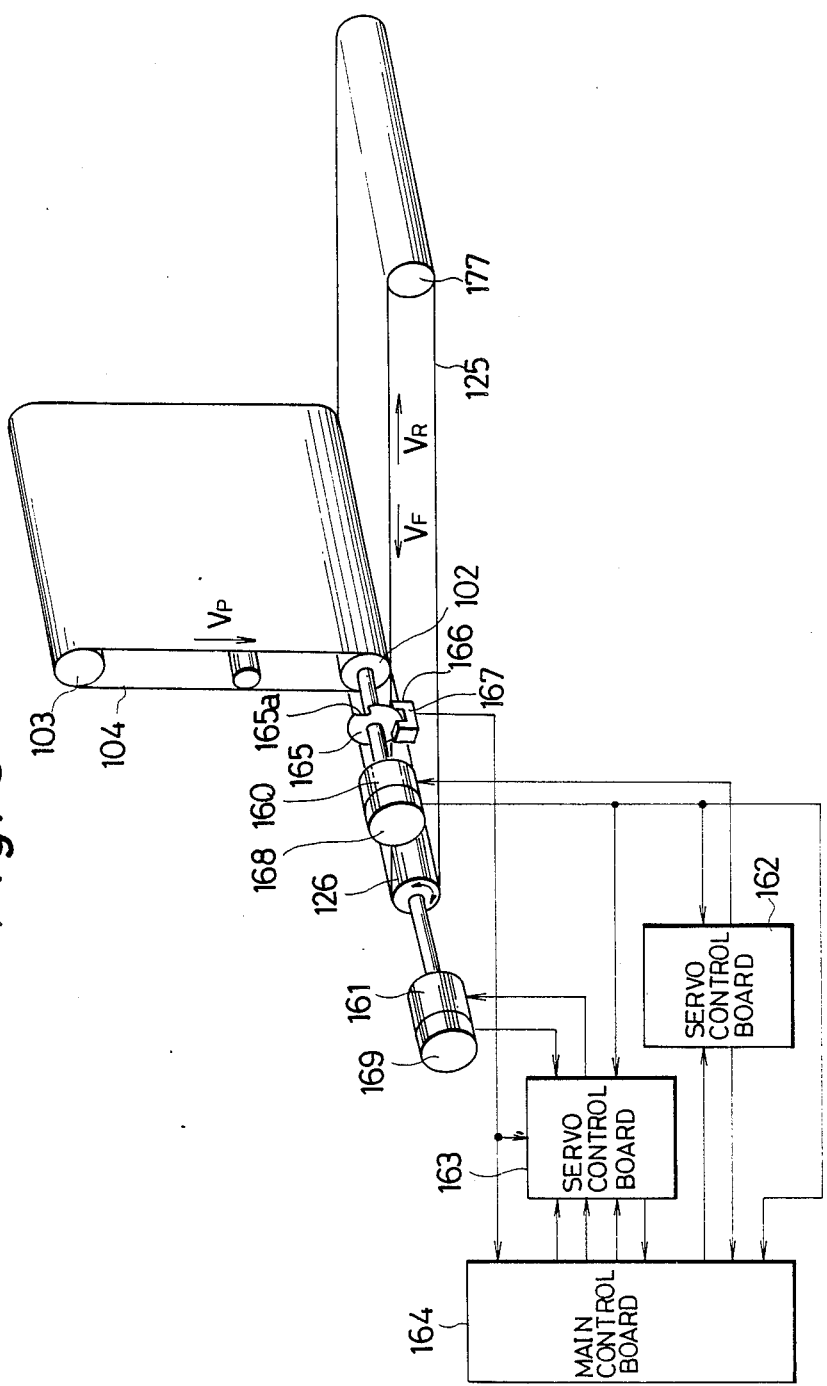

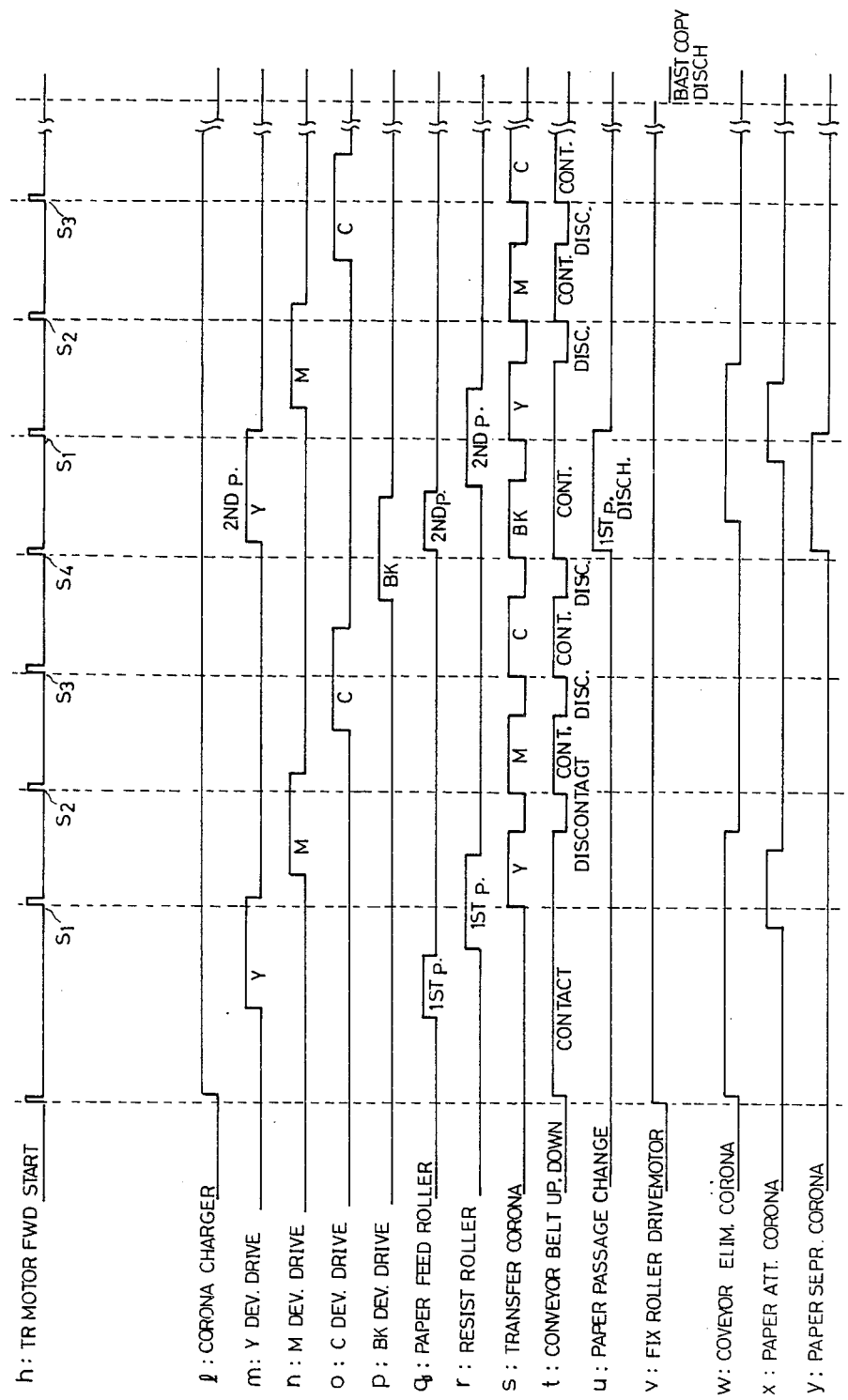

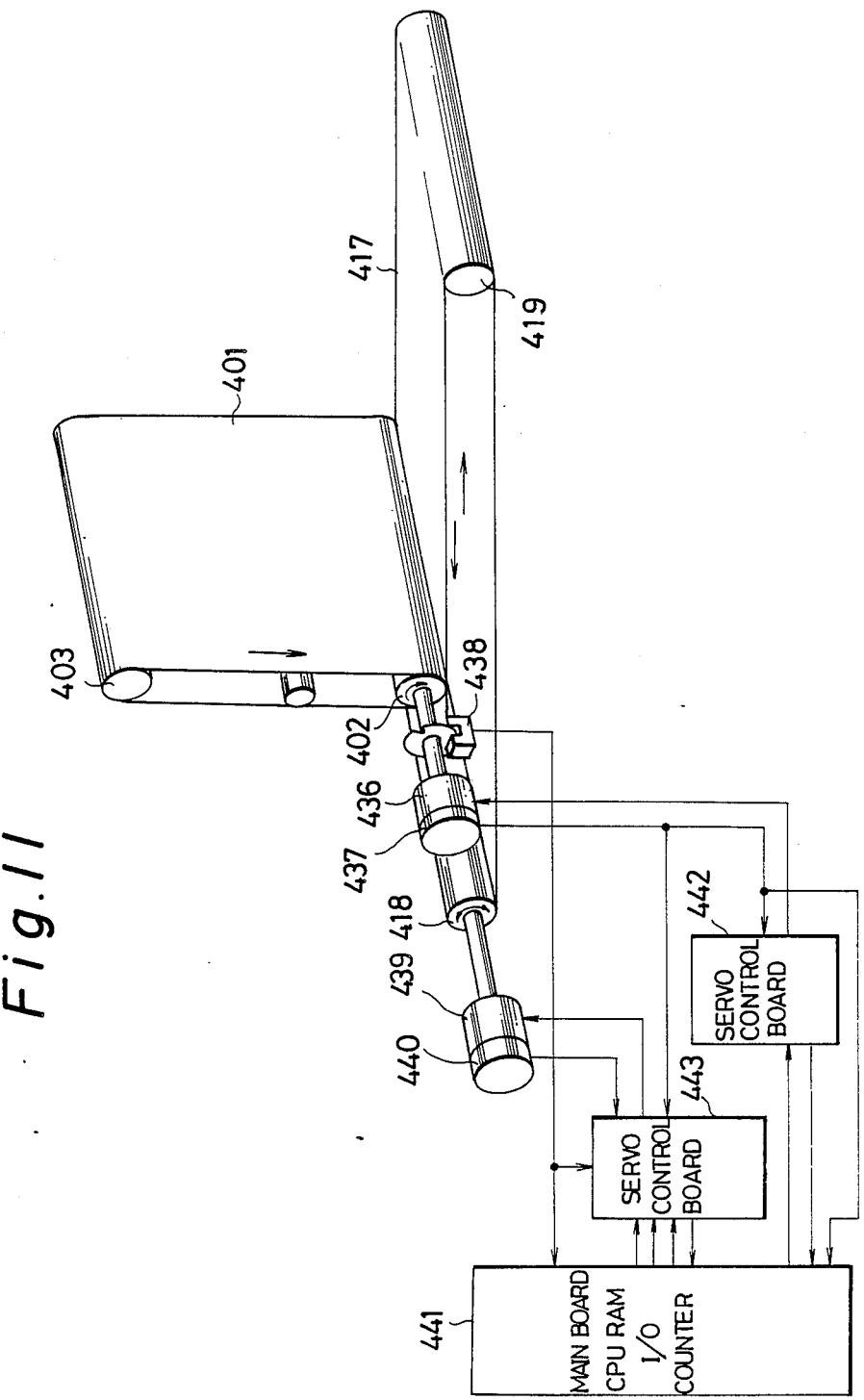

COLOR RECORDING APPARATUS

BACKGROUND OF THE INVENTION

The present invention relates to a color recording apparatus comprising a recording medium on which a plurality of images in different colors such as yellow, magenta, cyanogen, and black are overlappingly recorded to form a multicolored image.

Also, the present invention relates to a color recording apparatus such as a color copying apparatus or a color printer in which a multicolored image is formed by a switch back type image transferring mechanism.

Further, the present invention relates to a color recording apparatus in which a multicolored image is formed on a paper in such a way that a plurality of images analyzed in a different color, respectively, are formed on a image carrier one after another and after that the images are overlappingly transferred from the image carrier to the paper which is supported and conveyed by a paper conveyor means which is movable forward and backward and which means also movable toward and away from the image carrier.

In accordance with one type of conventional color copying apparatuses, a multicolored image is formed on a record paper by overlapping and transferring a plurality of different color toner images comprising a group of a yellow image, a magenta image, and a cyanogen image or a group of a yellow image, a magenta image, cyanogen image and a black image. To be more precise, first, an electrostatic latent image corresponding to a yellow component of an original image to be copied is formed and developed by a yellow toner, then the developed yellow color toner image is transferred to a record paper. Second, an electrostatic latent image corresponding to a magenta component of the original image is formed and developed by a magenta color toner. The developed magenta toner image is transferred to the record paper overlapping the yellow toner image. After that, an electrostatic latent image corresponding to a cyanogen component of the original image is formed and developed by a cyanogen color toner. The developed cyanogen color toner image is transferred to the record paper on which the yellow image and the magenta image are overlappingly formed. If the copying apparatus comprises a black toner developer, an electrostatic latent image corresponding to a black component of the original image is formed and developed by the black toner. The black toner image is transferred to the record paper overlapping the preceding three different color images.

With the above mentioned method for recording the multicolored image, it is important to precisely align the different color toner images with each other on the record paper in order to obtain a clear color image.

For example, Japanese Unexamined Patent Publication No. 62-239178 discloses a flash exposure type color record apparatus which comprises a photoconductor belt arranged along three transferring positions in such a way that the latent image forming positions and the transferring positions are situated at predetermined positions, respectively, in accordance with the circumference length of the drive roller of the photoconductor belt so as to prevent the misalignment of the color images on the record paper.

However, the above mentioned technique disclosed in the publication can not simply be applied to the color recording apparatus which forms a multicolored image by overlapping a plurality of different monochrome color images on a record paper which is reciprocated by a conveyor means. This is because that this kind of color recording apparatus has only one common transferring position where the plurality of different color images are transferred one after another by reciprocating the conveyor means instead of arranging a plurality of transferring positions corresponding to the different colors, respectively, therefore, the problem of the misalignment of the color toner images on the paper can not be obviated by the above mentioned prior art technique which aims to form each of a plurality of latent images precisely at a predetermined position on the photoconductor belt corresponding to the respective different color.

Also, for example, Japanese Unexamined Patent Publications Nos. 62-186282 and 62-118366 disclose another color copying apparatus which comprises an original support plate on which an original to be copied is placed and which plate is movable forward and backward and a conveyor belt which carries a record paper thereon and moves forward and backward wherein the original support plate and the conveyor belt are mechanically linked to be synchronized with each other. In accordance with this original moving type color copying apparatus, it becomes possible to obtain a clear color copy without misaligning the color components transferred on the paper since the record paper moves along with the original to be copied.

However, the above mentioned prior art technique disclosed in the publications can not be applied to a color printer which forms a color hard copy from a video signal transmitted from a TV system or an image scanner which is provided independently from the printer. Also, the prior art technique can not simply be utilized in the original scanning type color copying apparatus when a scaling system is in operation.

On the other hand, conventionally, it has been known various kinds of electrophotographic color copying apparatus which comprises a means for repeating the transferring operation of different monochrome color images to form a multicolored image from a plurality of different color images. For example, as such a image transfer repeating means, a transfer drum, a system comprising a plurality of photoconductors disposed in series and a switch back transferring system are known.

However, with respect to the transfer drum means, a hard paper such as a post card can not be used as a record paper since the record paper must be flexible enough to be wound around the drum. Also, the record paper requires a blank portion at an end of the paper for clamping the paper to the drum. Besides, the circumferential length of the drum must be longer than the length of the paper, which causes to enlarge the structure of the copying apparatus.

On the other hand, in accordance with the system comprising a plurality of photoconductors disposed in series, a relatively hard paper can be used and has an advantage that the copying operation can be carried out at a high speed. However, the provision of the plurality of photoconductors inevitably causes to enlarge the structure of the copying apparatus and increase the cost thereof.

Also, with respect to the switch back image transfer system which is disclosed for example in the Japanese Unexamined Patent Publication No. 62-118366, the length of the transferring belt is shortened and the leading edge and the trailing edge of the paper are separated from the drum in such a way that the edges are guided to a paper discharge tray and a paper feed cassette, respectively, which makes it possible to use a hard paper and print a color image on an entire area of the paper due to the structure thereof which also makes it possible to realize a compact structure and reduce the cost thereof. However, this structure has a disadvantage that the speed of the transfer belt in the backward motion thereof is the same as that in the forward motion thereof, which results in the reduction of the speed of the copying operation in comparison to the transfer drum means.

As mentioned above, the color recording apparatus comprising the switch back image transfer system has advantages that the system makes it possible to use a hard paper and print a color image on an entire area of the paper due to the structure thereof which also makes it possible to realize a compact structure and reduce the cost thereof, by constructing the structure in such a way that the length of the transferring belt is shortened and the leading edge and the trailing edge of the paper are separated from the drum in such a way that the edges are guided to a paper discharge tray and a paper feed cassette, respectively.

Although the switch back image transfer system has the above mentioned advantages, the system has a problem as described below. That is, the electrostatic latent image forming positions and the image transferring positions on the photoconductor belt are determined corresponding to one specific paper such as a largest standard size paper. Therefore, the operational speed of the apparatus is always the same irrespective of the size of the record paper so that the speed can not be heightened even when a paper of small size is used.

SUMMARY OF THE INVENTION

It is therefore a first object of the present invention to provide a color recording apparatus which comprises a means for reciprocating the record medium on which a plurality of different color images are overlappingly transferred to form a multicolored image precisely aligning the different color images with each other.

The above mentioned first object of the invention can be achieved by a color recording apparatus comprising: an electric charge carrier; an electrostatic latent image forming system for forming an electrostatic latent image which corresponds to an original image on the electric charge carrier; a development system for developing the electrostatic latent image; a transfer system for transferring the developed image from the electric charge carrier to a record medium; a conveyor system for moving the record medium forward and backward; and a control system for controlling each part of the apparatus so as to overlappingly record a plurality of monochrome images to form a multicolored image on the record medium by moving the record medium forward and backward, wherein the control system is constructed in such a way that prior to a transferring operation, the record medium is positioned at a predetermined point in front of a transfer position and that a forward movement of the record medium is started in response to a start of an electrostatic latent image forming operation each time the transferring operation is carried out.

An advantage of the above mentioned structure of the present invention is that the developed different color images are precisely overlapped with each other on the record medium since the forward movement of the record medium is started in response to the start of the electrostatic latent image forming operation to form an electrostatic latent image on the photoconductor so that the record medium conveying motion and the latent image forming motion are precisely synchronized with each other by a predetermined timing relation.

In other words, the advantage is derived from the fact that the reference point of the operational control of the conveyor motion is renewed each time for starting the transferring operation so that timing error or lag is minimized which error or lag increases according as time passes and the operation proceeds due to disturbance and noise from outside of the control means. That is, if the electric charge carrier and the conveyor move precisely at a constant speed at any time after some use of the apparatus, it would be possible to avoid the timing error or lag on the basis of any reference to control the operation thereof. However, actually outer disturbance or noise can not completely be removed, therefore, the timing error or lag is increased according as time passes from the setting point of the reference for controlling the starting point of the forward motion of the conveyor for carrying out the image transferring operation.

The present invention makes it possible to obviate the problem of misalignment of the different color images overlappingly transferred on the record paper and form a clear image in multicolors by renewing the reference point for controlling the starting motion of the image transfer system in cooperation with the conveyor means for conveying the record paper each time for starting the image transferring operation.

It is a second object of the present invention to provide a further color recording apparatus which comprises a means for reciprocating the record medium on which a plurality of different color images are overlappingly transferred to form a multicolored image precisely aligning the different color images with each other.

The above mentioned second object of the invention can be achieved by a color recording apparatus comprising: an electric charge carrier; an electrostatic latent image forming system for forming an electrostatic latent image which corresponds to an original image on the electric charge carrier; a development system for developing the electrostatic latent image; a transfer system for transferring the developed image from the electric charge carrier to a record medium; a conveyor system for moving the record medium forward and backward; and a control system for controlling each part of the apparatus so as to overlappingly record a plurality of monochrome images to form a multicolored image on the record medium by moving the record medium forward and backward, wherein the apparatus further comprises a first signal generation system which outputs a signal in a predetermined cycle corresponding to the repetition cycle of the reciprocation movement of the conveyor system and a second signal generation system which outputs a signal having a frequency shorter than that of the first signal generation means to correct the frequency of the signal from the first signal generation system and wherein the control system counts the number of the signal waves of the first signal generation system and the second signal generation system to control the conveyor means.

For example, with respect to the color printer which forms a multicolored hard copy from a video signal transmitted from a TV system or an image scanner which is independent from the printer, it is critical to precisely position the record paper at a predetermined point to obtain a clear color copy without misalignment of color components. Therefore, it is desirable to measure the amount of movement of the conveyor means as accurately as possible and control the conveyor motion on the basis of the measured data. For this purpose, in general, the conveyor motion detection device for measuring the shifted distance of the conveyor comprises an encoder having a very short pulse interval (frequency) with respect to the amount of the movement of the conveyor. However, such an encoder having a high frequency is apt to error due to disturbance or noise from outside. This problem is attenuated in accordance with the present invention which is featured to comprise a first signal generation system which outputs a first signal having a low frequency corresponding to the forward movement of the conveyor system and a second signal generation system which outputs a second signal having a high frequency wherein the conveyor system is controlled by the first signal which is corrected by the second signal, thus controlling the conveyor system accurately without being affected by disturbance or noise.

Also, in the backward movement operation of the record paper in accordance with the present invention, it is possible to position the record paper at a predetermined point after the backward motion of the conveyor by slightly moving the conveyor forward so that the positional error due to backlash of the conveyor structure can be removed, which makes it possible to obviate the problem of misalignment of different color images on the record paper due to the reciprocation movement of the record paper.

Further, the present invention was made considering the above mentioned drawbacks of the prior art, and it is therefore a third object of the present invention to provide a color record apparatus which makes it possible to process the images to be recorded at a high speed as well as to obviate the problem of misalignment of the different color images printed on the record paper.

The third object of the invention is achieved by a color record apparatus which comprises: one photoconductor; an exposure system for exposing the photoconductor to form electrostatic latent images on the photoconductor by projecting a plurality of optical images one after another which images are analyzed from an original image to be recorded; a development system for developing the latent images in a different color, respectively; a conveyor system for conveying a record paper forward and backward with respect to the photoconductor; and a transfer system for transferring the developed different color images on the record paper in such a way that the different color images are transferred one above the other on the paper to overlap with each other so that one multicolored image is formed from the plurality of the different color images on the record paper, wherein the apparatus further comprises: a first drive system for rotating the photoconductor; a second drive system for rotating the conveyor system forward and backward to reciprocate the conveyor; and a control system for controlling the first drive system and the second drive system as well as for positioning the photoconductor at a predetermined position in relation to the paper conveyor system in such a way that the backward movement of the record paper conveyed by the conveyor system is faster than the forward movement thereof.

Advantages of the above mentioned structure of the present invention are that any paper including a hard paper can be used, that an entire area of the paper surface can be used as an image forming area, that the cost is reduced, that a compact structure of a switch back type transfer system is realized, that the copying speed is heightened and that the different color images can be transferred to the paper one above the other accurately aligning with each other.

Further, the present invention was made considering the above mentioned problems of the prior art color record apparatus which comprises an image carrier and a paper conveyor system which is able to move toward and away from the image carrier and driven independently from the image carrier. It is therefore a fourth object of the present invention to provide a color record apparatus which makes it possible to obviate the problem of jitter due to the fluctuation of the load acted on the image carrier and the paper conveyor system which apparatus also makes it possible to avoid the misalignment of the different color toner images overlapped on the paper as well as to elongate the service life thereof by preventing the image carrier from being damaged by friction between the image carrier and the paper conveyor system due to the difference of speed between the image carrier and the paper conveyor.

The fourth object is achieved by a color record apparatus which comprises a conveyor shifting means for moving the conveyor toward and away from the image carrier and a control means for controlling the conveyor shifting system in such a way that the conveyor comes in contact with the image carrier on the condition that the speed of the conveyor becomes equal to that of the image carrier.

Also, the present invention satisfies the requirement for obviating the problem of misalignment of the different color images overlapped one above the other on the record paper by controlling the image carrier and the paper conveyor in such a way that, first, the paper is fed to the conveyor and a first color toner image is transferred to the paper during the time that the conveyor is driven in the forward motion thereof, after that the conveyor is driven to move backward to a waiting position, then the transfer operation of the another color toner image to the paper starts from this state in response to a timing signal which is output when the image carrier comes to a predetermined position so that the conveyor starts to move forward. Also, in this operation of controlling the image carrier and the conveyor, the speed on the conveyor is controlled to be equal to that of the image carrier, and further the positional relation between the conveyor and the image carrier is controlled to be equal to that in the preceeding transfer operation of the first color toner image before the leading end of the image and the leading edge of the record paper come to the transfer position.

Advantages of the above mentioned structure of the present invention are that the problem of jitter can be attenuated by minimizing the fluctuation of load which acts on the image carrier and the conveyor, that the image carrier is prevented from being damaged due to the friction between the image carrier and the conveyor, and that the problem of misalignment of the different color images transferred on the paper is attenuated by maintaining the positional relation unchanged between the image carrier and the conveyor in every transfer operation of each different color toner image.

Further, the present invention was made considering the above mentioned drawbacks of the prior art. It is a fifth object of the present invention to provide a color record apparatus which makes it possible to obviate the problem of misalignment of the different color images overlappingly printed on a record paper as well as to vary the speed of the recording operation in accordance with the size of the record paper, which makes it possible to heighten the operational speed of the apparatus when the paper size is small.

The fifth object of the invention is achieved by a color record apparatus which comprises: one photoconductor belt; and exposure system for exposing the photoconductor belt to form electrostatic latent images on the photoconductor belt by projecting a plurality of optical images one after another which images are analyzed from an original image to be recorded; a development system for developing the latent images in a different color, respectively; a conveyor system for conveying a record paper forward and backward with respect to the photoconductor belt; and a transfer system for transferring the developed different color images on the record paper in such a way that the different color images are transferred one above the other on the paper to overlap with each other so that one multicolored image is formed from the plurality of the different color images on the record paper, wherein the apparatus further comprises a timing control system which controls the timing of exposing the optical image to the photoconductor belt in such a way that the timing is synchronized with the rotation of the drive roller of the photoconductor belt so that the cycle of the exposure operation is equal to a value of (one cycle of the drive roller) multiplied by (number of rotation) and a timing varying system for varying the time of the cycle by the timing control system in accordance with the size of the record paper.

Advantages of the above mentioned structure of the present invention are that the problem of misalignment of the different color images overlappingly printed on a record paper is reliably obviated even when the size of the record paper is changed which makes it possible to print a clear multicolored image on the record paper and that the speed of the recording operation can be heightened when the size of the record paper is small since the exposure timing of the exposure system is controlled to synchronize with the rotation of the drive roller of the photoconductor belt in accordance with the size of the record paper.

Further objects and advantages of the present invention will be apparent from the following description of the preferred embodiments of the invention as illustrated in the accompanying drawings.

BRIEF DESCRIPTION OF THE DRAWINGS

FIGS. 4b and 4c are timing charts representing the function of main parts of the control system in detail, respectively;

FIG. 5 is an explanatory view for representing and explaining a part of another embodiment of the color copying apparatus in accordance with the present invention and a structure of a control system connected to the color copying apparatus;

FIGS. 10a and 10b are timing charts for representing the function of a control system of the color copying apparatus of FIG. 9;

FIG. 11 is an explanatory view for explaining a control system for controlling a photoconductor belt and a paper conveyor belt of the color copying apparatus of FIG. 9;

DESCRIPTION OF THE PREFERRED EMBODIMENTS

Figure 1:
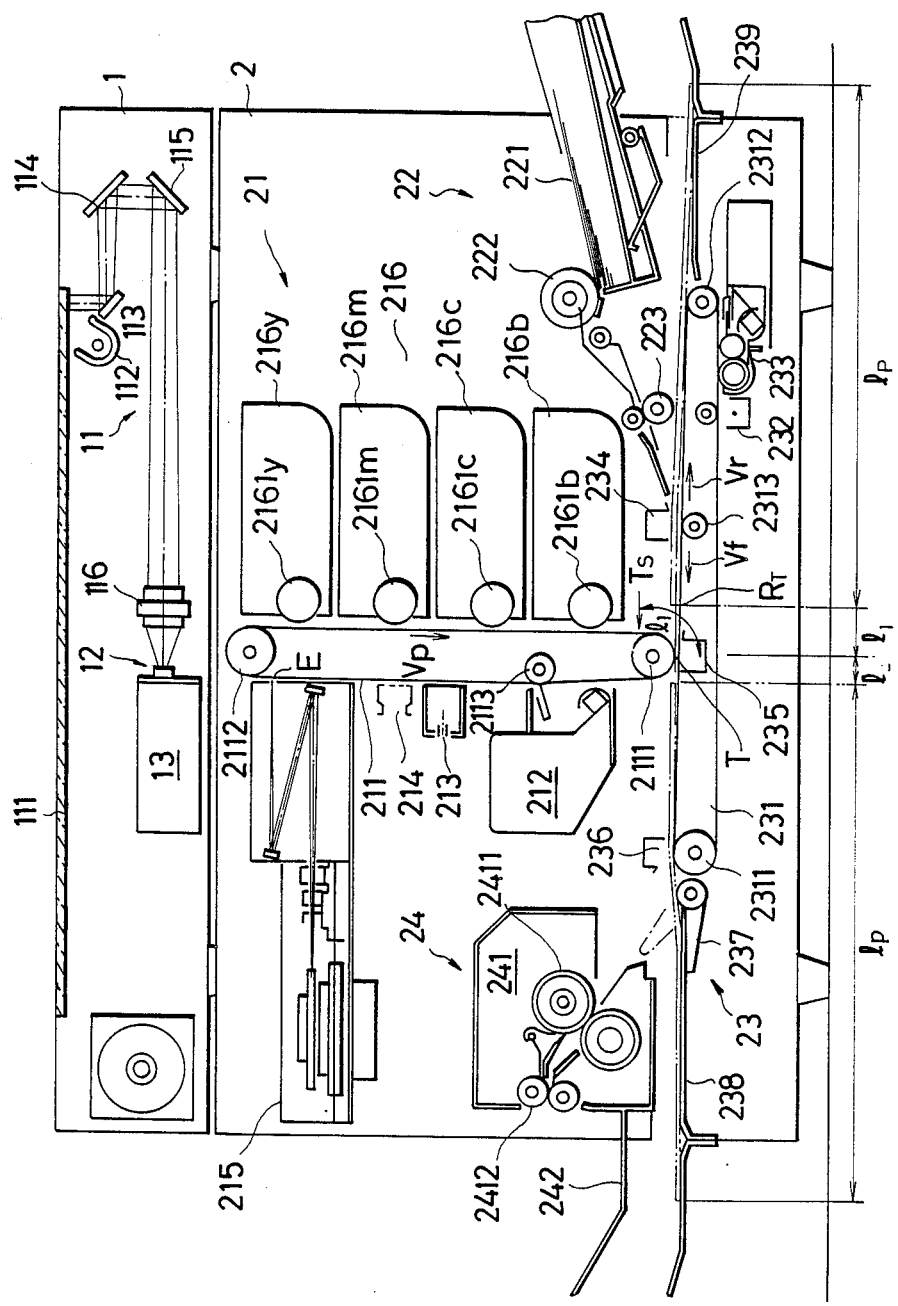
FIG. 1 is a vertical sectional view for representing a structure of an embodiment of the color copying apparatus in accordance with the present invention.

FIG. 1 illustrates an embodiment of a color copying apparatus in accordance with the present invention in a vertical section thereof.

The color copying apparatus is essentially constructed by an image scanner 1 and a color laser printer 2.

The image scanner 1 comprises an optical scanning system 11, photoelectric converter system 12 and an image processing system 13.

The optical scanning system 11 comprises a contact glass 111, an irradiation lamp 112, mirrors 113, 114 and 115, a condenser lens 116 and drive means for driving the constituents. With this structure, an original (not shown) is placed on the contact glass and optically scanned so that the reflection light reflected from the original is guided to the photoelectric converter system 12.

The photoelectric converter system 12 comprises a color separation filter and a CCD (charge coupled device) array. With this structure, the color separation filter separates the reflection light of the original introduced from the optical scanning system 11 to a red component (R), a green component (G) and a blue component (B). Each color component is converted to an electric signal in each of picture elements.

The image processing system 13 comprises a hardware for controlling the constituents of the apparatus and processing electric signals from each component of the control system. The image processing system 13 processes the signal output from photoelectric converter system 12 with a UCR (under color removement) treatment so as to obtain binary signals corresponding to yellow (Y), magenta (M), cyanogen (C) and black (Bk), respectively, which are referred to as Y data, M data, C data and Bk data, respectively, in the description below.

Figure 2:
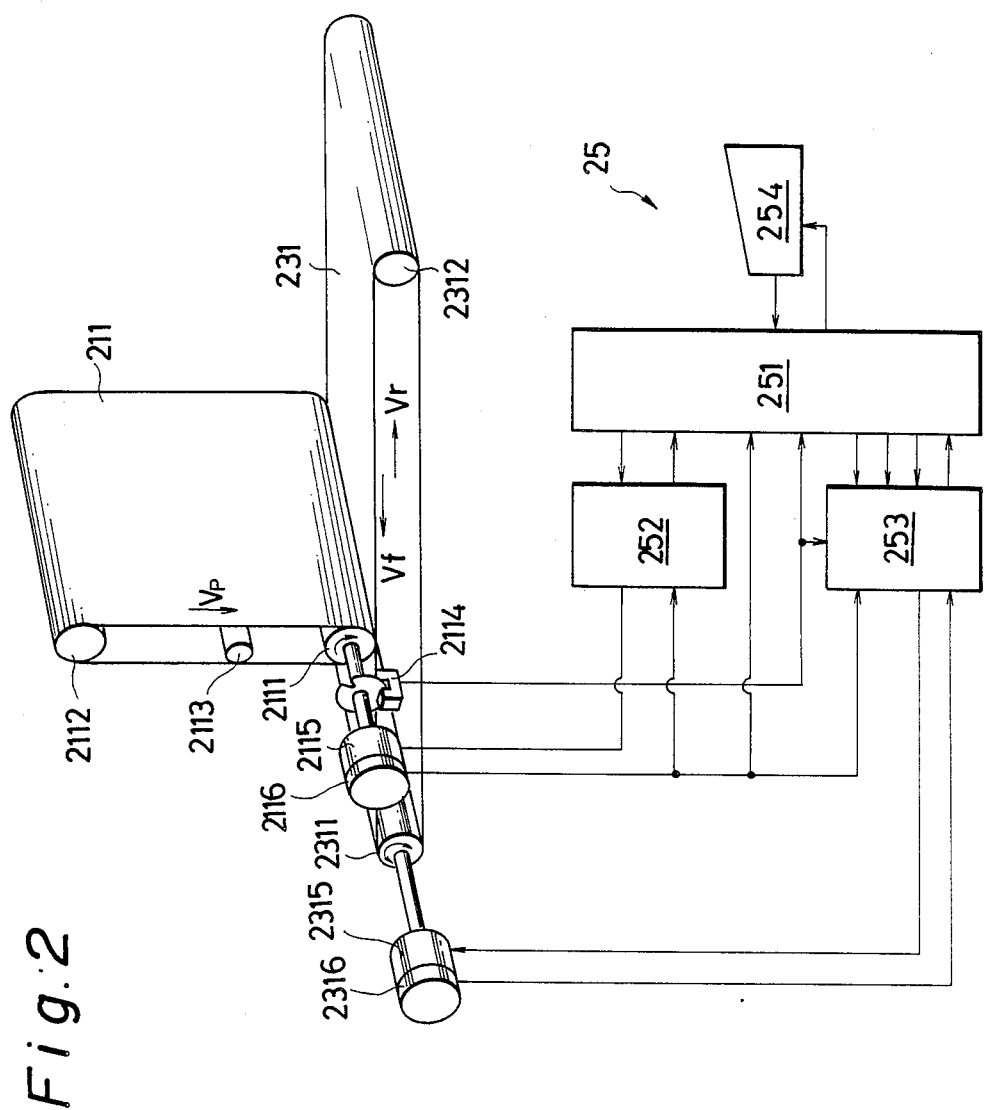
FIG. 2 is an explanatory view for representing and explaining a part of the structure of the color copying apparatus of FIG. 1 and a structure of a control system connected to the apparatus.

The laser printer 2 is constructed by an image forming system 21, a paper feed system 22, a transfer system 23, a fixing and discharging system 24 and a control system 25 (see FIG. 2).

The image forming system 21 comprises a photoconductor belt 211, a cleaning unit 212, a static eliminator unit 213, an electrostatic charger unit 214, a laser writing unit 215 and a development unit 216.

The photoconductor belt 211 is wound around and spans between a drive roller 2111 and a free roller 2112. A press roller 2113 is disposed in front of the cleaning unit 212 in such a way that the photoconductor belt 211 is urged toward the cleaning unit 212 by the press roller 2113. As illustrated in FIG. 2, the drive roller 2111 of the photoconductor belt comprises a rotary shaft to which a rotary pulse generator 2114 and a drive motor 2115 are connected. The drive motor 2115 comprises a encoder 2116 integrally connected thereto. The photoconductor belt 211 is driven by the drive motor 2115 at a speed V in the direction of an arrow Vp.

The cleaning unit 212 sweeps the surface of the photoconductor belt 211 to remove toner remaining thereon. The static eliminator unit 213 applies an eliminating corona on the surface of the photoconductor belt to eliminate the electrostatic charge thereon so that the voltage thereof becomes zero. After that, the electrostatic charger unit 214 applies a charging corona on the surface of the photoconductor belt 211 to evenly charge the surface. A suction fan (not shown) provided with an ozone filter is disposed around the static eliminator unit 213 and the electrostatic charger unit 214 to prevent ozonization of the atmosphere due to the corona function of those units.

The laser writing unit 215 outputs a laser beam which is modulated as an ON-OFF modulation signal in the unit on the basis of the yellow data, the magenta data, the cyanogen data and the black data, respectively, transmitted from the image scanner 1. The laser beam is irradiated to the photoconductor belt 211 to form an electrostatic latent image thereon.

The development unit 216 comprises a yellow development device 216y having a yellow toner therein, a magenta development device 216m having a magenta toner therein, a cyanogen development device 216c having a cyanogen toner therein and a black development device 216b having a black toner therein. Each of the development devices 216y, 216m, 216c and 216b is provided with a development roller 2161y, 2161m, 2161c or 2161b. Each development roller has a shaft which is received in a groove (not shown) which groove inclines upward toward the photoconductor belt 211 in such a way that when the roller is not driven to rotate, the roller falls along the groove away from the photoconductor belt by the gravity force, while when the roller is driven to rotate, the roller moves upward along the groove toward the photoconductor belt by the rotational force thereof and comes in contact with the photoconductor belt so that the toner carried on the roller is transferred and attaches onto the electrostatic latent image formed on the photoconductor belt.

The paper feed system 22 comprises a paper cassette 221, a paper feed roller 222, a resist roller 223 and a drive system for driving those rollers. The paper cassette 221 houses a stack of papers of a predetermined size accumulated therein. The paper feed roller 222 picks one paper at a time from the paper cassette 221. The paper is fed one by one from the paper cassette to the transfer system 23 through the resist roller 223 at a predetermined interval.

The transfer system 23 comprises a transfer belt (paper conveyor belt) 231, a static eliminator unit 232, a cleaning unit 233, an electrostatic charger unit 234 for holding the paper, a transfer unit 235, an electrostatic charger unit 236 for separating the paper, a changing lever unit 237, a front end guide plate 238 and a rear end guide plate 239.

The conveyor belt 231 is wound around and spans between a drive roller 2311 and a free roller 2312. As illustrated in FIG. 2, a motor 2315 is connected to a shaft of the conveyor drive roller 2311 at an end thereof. The motor comprises a first encoder 2316 integrally secured thereto. Also, a second encoder is connected to the other end of the motor shaft. The second encoder is not shown in FIG. 2 since it is positioned behind the photoconductor belt 211 in the drawing. The conveyor belt 231 is driven by the motor 2315 in such a manner that when the conveyor belt is moved in the direction of an arrow Vf, the speed of the conveyor is the same as that of the photoconductor belt 211, on the other hand when the conveyor belt is moved in the direction of an arrow Vr, the speed of the conveyor belt is far faster than that of the photoconductor belt 211.

In a nonoperation state, the conveyor belt 231 is separated from the photoconductor belt 211. A lift up roller 2313 is disposed at a position between the conveyor belt drive roller 2311 and the free roller 2312. The lift up roller 2313 is forced to move upward by energizing a solenoid (not shown) and urges the conveyor belt upward so that the conveyor belt 231 comes in contact with the photoconductor belt 211 at a point T.

The static elimination unit 232 applies an electrostatic elimination corona to the surface of the conveyor belt 231 to remove the electrostatic charge therefrom. The cleaning unit 233 sweeps the surface of the conveyor belt 231 to remove the toner therefrom.

The electrostatic paper charger unit 234 applies an electrostatic charging corona to the surface of the conveyor belt 231 to charge the surface so as to electrostatically attract and hold the paper thereon.

The transfer unit 235 applies a corona to the paper held on the conveyor belt from behind the conveyor belt at the point T where the photoconductor belt 211 comes in contact with the conveyor belt 231 so as to transfer the toner image developed on the photoconductor belt to the paper.

The paper separation electrostatic charger unit 236 applies a corona having a polarity reverse to that of the paper charger unit 234 so as to cancel the electrostatic charge on the paper to release the electrostatic attraction force between the paper and the conveyor belt.

The change lever unit 237 moves between a first position depicted in a solid line and a second position depicted in a dash dot line. When the lever is in the first position, the paper is guided to the front end guide plate 238, whereas the lever is in the second position, the paper is guided to the fixing and discharging system 24. The change lever unit 237 is driven to rotate by, for example, a solenoid (not shown).

The fixing and discharging system 24 comprises a fixing unit 241 and a paper stacker tray 242. The fixing unit 241 comprises a fixing roller 2411, a discharge roller 2412 and a drive means for driving the rollers so that the paper transferred from the transfer system is conveyed through the fixing roller 2411 where the paper undergoes a fixation operation and discharged into the paper stacker tray 242.

The control system 25 comprises a CPU (central processing unit), a memory device, a counter circuit and an I/O interface circuit. The control system also comprises a main control board 251, a first servo control board 252 for controlling the photoconductor belt drive motor 2115, a second servo control board 253 for controlling the conveyor belt drive motor 2315 and an operation and display board 254.

Figure 3:
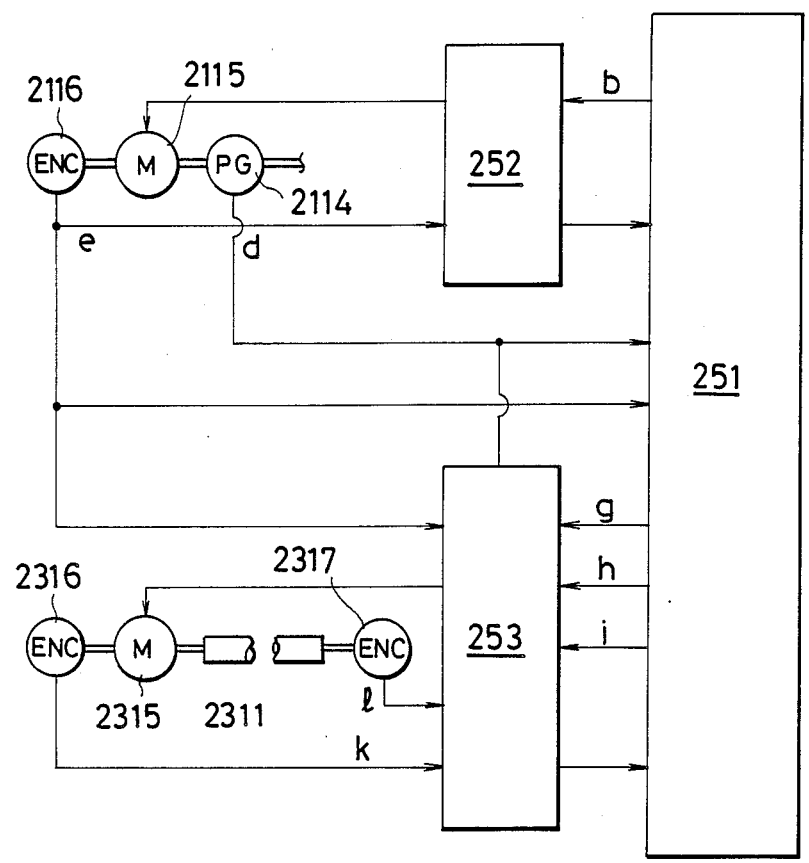
FIG. 3 is a block diagram of the control system illustrated in FIG. 2.

The motors and encoders mentioned above are connected to the control system 25 in such a way mentioned below with reference to FIG. 3.

The photoconductor belt drive motor 2115 is connected to the first servo control board 252 through a line for energizing the motor. The rotary pulse generator 2114 is coaxially connected to the photoconductor belt drive motor 2115. Signal lines d (depicted in one line in the drawing) connect the pulse generator 2114 to the main control board 251 and the servo control board 253, respectively. Also, the encoder 2116 of the drive motor 2115 is connected to the main control board 251, the first servo control board 252 and the second servo control board 253, respectively, through signal lines e.

On the other hand, the conveyor belt drive motor 2315 is connected to the second servo control board 253. Also, the first encoder 2316 and the second encoder 2317 mechanically and coaxially connected to the motor 2315, respectively, are electrically connected to the second servo control board 253 through signal lines k and l, respectively.

The main control board 251 outputs a signal b (ON-OFF signal) for driving the photoconductor belt drive motor 2115 to the first servo control board 252 which drives the motor 2115 in such a way that, when the signal b turns to a level H, the motor 2115 is rotated in a forward direction so that the photoconductor belt 211 moves in the direction Vp. The main control board 251 also outputs an ON-OFF signal g, a forward rotation signal h and a backward rotation signal i to the second servo control board 253 which drives the conveyor belt drive motor 2315 in such a way that, on the condition that the ON-OFF signal g is in a state of level H, when the forward rotation signal h turns to a level H, the conveyor belt drive motor 2315 starts to rotate in the forward direction so that the conveyor belt 231 moves in the direction Vf in FIG. 2 from the rising point of the signal h, whereas when the backward rotation signal i turns to a level H, the conveyor belt drive motor 2315 is rotated in the reverse direction so that the conveyor belt 231 moves in the backward direction Vr in FIG. 2 from the rising point of the signal i.

Function of the primary parts of the main control board 251 is described hereinafter with reference to the timing charts of FIGS. 4a, 4b and 4c.

To start the printing operation of the apparatus, an operator pushes a print start button of the operation and display board 254 so that a line of a print start signal a (FIG. 4a) transmits a pulse signal of level H, whereby the main control board 251 turns on the ON-OFF signal b for the photoconductor belt drive motor to level H to instruct the first servo control board 252 to energize the photoconductor belt drive motor 2115. The main control board 251 also turns on the ON-OFF signal g for the conveyor belt drive motor 2315 to level H to instruct the second servo control board 253 to drive the motor 2315 to rotate in the forward direction by turning the forward rotation signal h to level H so as to generate a pulse signal So.

In accordance with the instructions from the first and second servo control boards 252 and 253, the motor 2115 drives the photoconductor belt 211 to move in the direction of the arrow Vp at the speed of V (line c of the timing chart) while the motor 2315 drives the conveyor belt 211 to move in the direction of the arrow Vf at the same speed of V (line j of the timing chart).

During the time that the photoconductor belt drive motor 2115 is being energized, the rotary pulse generator 2114 outputs one pulse for each rotation of the photoconductor drive roller 2111. Also, the encoder 2116 outputs one pulse for every 10 $\mu$m shift of the photoconductor belt 211. These pulses are represented by a rotation detection signal d and a photoconductor encode signal e, respectively, in the timing chart of FIG. 4a. On the other hand, during the time that the conveyor belt drive motor 2315 is being energized, the first encoder 2316 outputs one pulse for every 10 $\mu$m shift of the conveyor belt 231 while the second encoder 2317 outputs one pulse for every one mm shift of the conveyor belt 231. These pulses are represented by a first conveyor encode signal k and a second conveyor encode signal l, respectively, in the timing chart of FIG. 4a.

When three pulses are generated in the rotation detection signal d after the print start signal a is energized to generate a start pulse, the surface of the photoconductor belt 211 comes to a laser writing point E (FIG. 1) where the laser beam irradiates the photoconductor belt surface after the surface is cleaned by the cleaning unit and evenly charged by the electrostatic charging unit after eliminating the unnecessary electrostatic charge of the preceding operation remaining thereon. In this state, the main control board 251 instructs the laser writing unit 215 to write an image in accordance with the yellow data as represented in a line f of the timing chart of FIG. 4a. In accordance with the instructions from the main control board 251, the laser writing unit 215 irradiates the laser beam to the surface of the photoconductor belt 211 at the position E which beam is modulated to become an ON-OFF signal on the basis of the yellow data transmitted from the image scanner 1 so that an electrostatic latent image is formed on the photoconductor belt surface corresponding to the yellow data.

Figure 4A:
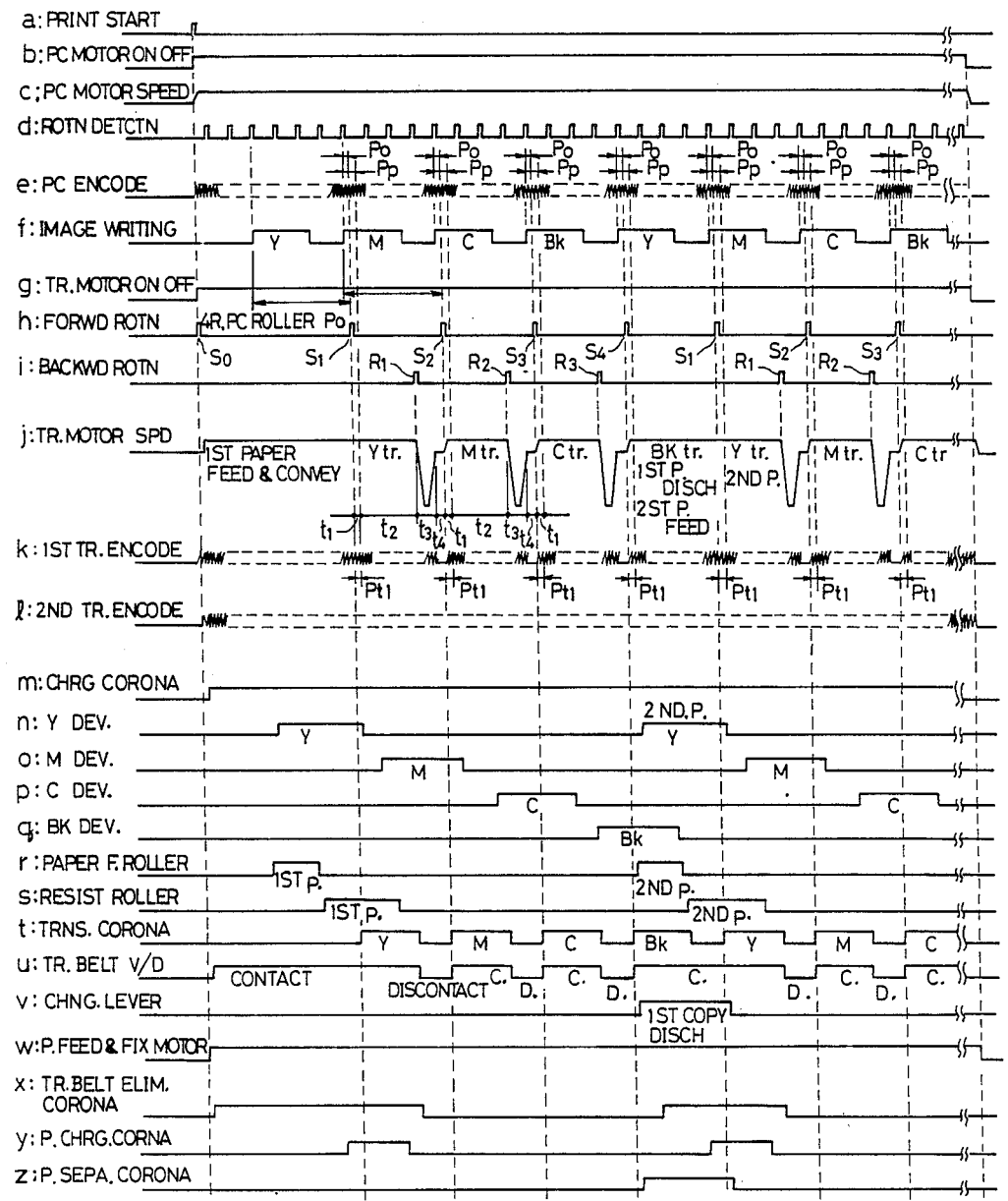
FIG. 4a is a timing chart of the function of a main control board arranged in the control system illustrated in FIGS. 2 and 3

On the other hand, during the time that the photoconductor belt undergoes the above mentioned operation, the conveyor belt 231 undergoes the static elimination operation and the cleaning operation as represented in a line x of the timing chart of FIG. 4a. The conveyor belt 231 is then urged upward to be pressed against the photoconductor belt 211 by the function of the lift up roller 2313 which is actuated by the solenoid as represented by a line u of the timing chart of FIG. 4a. Also, the paper feed roller 222 picks one paper from the paper cassette and feeds it to the resist roller 223 as represented by a line r of the timing chart of FIG. 4a.

The main control board 251 energizes the yellow development device 216y considering the timing that a leading end of the electrostatic latent image formed on the photoconductor surface on the basis of the yellow data comes to the development position facing to the development device 216y as represented by a line n of the timing chart of FIG. 4a. By this operation, as mentioned before, the development roller 2161y of the yellow development device 216y comes in contact with the photoconductor belt 211 so that the electrostatic latent image corresponding to the yellow data is developed by the yellow toner carried on the surface of the development roller 2161y.

After that, when a leading edge of the developed yellow toner image comes to a point which is a distance $l_0$ before the transfer point T, the resist roller 223 is energized as represented by a line s of the timing chart of FIG. 4a to feed a record paper, which is followed by energizing the paper charging unit 234 as represented by a line y of the timing chart so that the record paper is electrostatically attracted to and held on the conveyor belt 231. The distance $l_0$ corresponds to the length from the transfer point T to the resist roller 223.

Also, when the leading edge of the yellow toner image comes to a point Ts which is a distance $l_1$ before the transfer point T, the main control board 251 turns on the forward rotation signal h to level H for a short time to generate a pulse signal $S_1$ so as to energize the transfer unit 235 as represented by a line t of the timing chart. This timing of energization of the transfer unit 235 corresponds to the time of four pulses of the rotation detection signal d (four rotations of the photoconductor belt drive roller 2111) plus Po pulse of the encode signal e. Also, at this timing, the leading edge of the record paper is at a position Rt which is a distance $l_1$ before the transfer point T.

Note that the conveyor belt drive motor 2315 continues to rotate in the forward direction irrespective of the generation of the pulse S1 since the servo control board 253 has already instructed the forward rotation of the drive motor 2315.

After a time $t_1$ from the generation of the pulse S1, the leading edge of the yellow toner image developed on the photoconductor belt 211 comes to the transfer point T simultaneously with the leading edge of the record paper so that the toner image is transferred from the photoconductor belt to the record paper by the function of the transfer unit 235. During this operation, the pulse number Pp of the photoconductor belt encode signal e output from the encoder 2116 becomes equal to the pulse number $Pt_1$ of the first transfer encode signal k output from the first encoder 2316.

After that, the leading edge of the record paper is separated from the conveyor belt 231 according as the record paper moves forward and guided to the leading edge guide plate 238 by the changing lever unit 237 which is in the position depicted in the solid lines in FIG. 1. Also, after the image transferring operation, the surface of the photoconductor belt 211 is swept and cleaned by the cleaning unit 212 and the electrostatic charge remaining on the surface is eliminated by the static elimination unit 213. After that, the photoconductor belt surface is again electrostatically charged evenly by the charger unit 214 and moves to the laser writing point E.

While the above operations are proceeded, the main control board 251 deenergizes the yellow development device 216y at a timing that the trailing edge of the electrostatic latent image corresponding to the yellow image passes the development position of the yellow development device 216y as represented in the signal line n of the timing chart of FIG. 4a. When the yellow development device 216y is deenergized, the development roller 2161y moves back away from the photoconductor belt 211.

The main control board 251 also deenergizes the transfer unit 235 at a timing that rear end of the toner image is transferred to the trailing edge of the record paper as represented by the timing line t of the timing chart. Also, the solenoid of the lift up roller 2313 is deenergized so that the conveyor belt 231 is moved back away and discontacted from the photoconductor belt 211 as represented by a timing line u of the timing chart of FIG. 4a.

When the record paper further moves forward to the position that the trailing edge thereof comes to a point which is a distance $l_2$ after from the transfer point T, the reverse rotation signal i is turned on to level H for a short time to generate a pulse signal $R_1$ so as to instruct the second servo control board 253 to drive the conveyor belt drive motor 2315 to rotate in the reverse direction. This timing is a time $(l_1+l_p+l_2)/V$, i.e., $(t_1+t_2)$ after the time that the pulse S1 is output, wherein $l_p$ represents the length of the record paper along the conveying direction. At this timing, the record paper is moved to a position depicted in a dash-two-dot line in FIG. 1.

The conveyor belt drive motor 2315 is driven to rotate in the reverse direction for a time $t_3$ which is far shorter than the time $(t_1+t_2)$. During this time $t_3$, the motor 2315 drives the conveyor belt 231 to move in the direction Vr at a speed of V' so that the record paper is moved rightward by a distance $(l_1+l_p+l_2)$. Accordingly, the leading edge of the record paper is moved back again to the point Rt while the trailing edge of the record paper is guided onto the rear end guide plate 239 so as to prepare the subsequent transfer operation of a magenta toner image.

On the other hand, the main control board 251 instructs the laser writing unit 215 to write an image in accordance with a magenta data at a timing that four pulses are output (the photoconductor belt drive roller 2111 is rotated four turns) after the instructions to write the image in accordance with the yellow data as represented by a timing line f of the timing chart. This timing of the magenta image writing instructions is prior to the timing of starting the transfer operation of the yellow toner image by the time length of the pulse Po of the photoconductor encode signal e as can be seen from the lines e, f and t of the timing chart of FIG. 4a.

In a manner similar to that for printing the yellow image mentioned above, the magenta development device 216m is energized at a timing that the leading edge of the electrostatic latent image in accordance with the magenta data comes to the development position of the magenta development device 216m as represented by a timing line o of the timing chart of FIG. 4a. After that, when the leading edge of the magenta toner image developed on the photoconductor belt comes to the point Ts which is a distance $l_1$ before the transfer point T, the main control board 251 turns on the forward rotation signal h to a level H for a short time to generate a pulse $S_2$ so as to instruct the second servo control board 253 to drive the conveyor belt drive motor to rotate in the forward direction and energize the transfer unit 235 as represented by the line t of the timing chart. In accordance with this manner, the servo control board 253 drives the conveyor belt drive motor 2315 to rotate in the forward direction so that the conveyor belt 211 moves in the direction of the arrow Vf and that the speed of the conveyor belt is risen to V.

Also, the main control board 251 energizes the solenoid of the lift up roller 2313 almost simultaneously with the output of the pulse $S_2$ so that the conveyor belt 231 is lifted and urged against the photoconductor belt 211 as represented by a timing line u of the timing chart.

The main control board 251 outputs the above mentioned pulse $S_2$ at a timing that after four pulses of the rotation detection signal d are generated (photoconductor drive roller 2111 is rotated four turns) plus the time length of the pulse $P_0$ of the photoconductor encode signal e from the timing of starting the image writing operation in accordance with the magenta data. At this timing, the leading edge of the record paper is at the position Rt which is a distance $l_1$ before the transfer point T. Accordingly, after a time length $t_1$ from the timing of the output of the pulse $S_2$ the leading edge of the magenta toner image developed on the photoconductor belt 211 comes to the transfer point T. This is achieved by controlling the drive motor in such a way that the pulse number $Pt_1$ of the first conveyor encode signal k output from the first encoder 2316 becomes equal to the pulse number Pp of the photoconductor encode signal e output from the encoder 2116 during the time of the forward motion of the photoconductor belt. In accordance with the manner mentioned above, after the time length $t_1$ from the timing of outputting the pulse $S_2$ the leading edge of the magenta toner image developed on the photoconductor belt 211 comes in contact with the leading edge of the record paper at the transfer point T so that the transfer operation of the magenta toner image from the photoconductor belt to the record paper can be started by the transfer unit 235.

After that, the above mentioned printing operations are repeated for forming and transferring the cyanogen toner image and the black toner image.

After the transferring operation of the black toner image is started, the main control board 251 energizes the solenoid of the changing lever unit 237 to change the lever position so that the record paper guided to the fixing unit 241. Also, the main control board 251 energizes the paper separation charging unit 236.

After that, the main control board does not instruct the servo control board 253 to drive the motor 2315 to rotate in the reverse direction even when the trailing edge of the record paper comes to the point the length $l_2$ downstream side of the transfer point T. Accordingly, the record paper is fed to the fixing unit 241.

The toner images of yellow, magenta, cyanogen and black transferred to the record paper undergo a heat fixation operation during passing through the fixing unit 241 so that the color images are fixed on the record paper. After that, the record paper is discharged into the paper tray 242.

The main control board 251 energizes the static elimination unit 232 and the cleaning unit 233 at a timing that the trailing edge of the record paper passes through the paper separation charging unit 236 so as to eliminate the electrostatic charge from the conveyor belt surface and sweep to remove toners attached thereon as represented by a timing line x of the timing chart of FIG. 4a.

When the copying apparatus is operated in a repeat mode for copying a plurality of same images from the original, the main control board 251 repeats the above mentioned operations in such a way that in parallel with the process for transferring and fixing the black toner image, the laser writing unit 215 writes the image in accordance with the yellow data in the same cycle as mentioned above and repeats the subsequent processes as represented by the timing line f of the timing chart of FIG. 4a.

When the last copy paper is discharged from the apparatus and when the photoconductor belt 211 and the conveyor belt 231 are cleaned and electrostatically eliminated, the copying operations are stopped and the apparatus returns to the initial state.

Note that in a monochrome copying mode operation, the color copying apparatus carries out one of the above mentioned copying processes for yellow, magenta, cyanogen and black. Also, in a dichromatic copying operation mode, the color copying apparatus carries out any two of the above mentioned copying processes for yellow, magenta, cyanogen and black. When the color copying apparatus is operated in a three color copying mode, the copying apparatus carries out any three of the above mentioned copying processes for yellow, magenta, cyanogen and black.

The functional control of the conveyor belt 231 is further described in detail below with reference to FIGS. 4b and 4c. FIG. 4b represents a part of the timing chart of FIG. 4a in an enlarged scale. FIG. 4c represents a part of the timing chart of FIG. 4b in a further enlarged scale.

As mentioned before, the copying apparatus operates in such a way that the main control board 251 outputs a pulse signal $S_0$ when the print start signal a is turned on to a level H and instructs the servo control board 253 to drive the conveyor belt drive motor 2315 to rotate in the forward direction, that the electrostatic latent image writing operation is started on the basis of the yellow data at the timing that the third pulse of the rotation detection signal d is output (photoconductor belt drive roller 2111 is rotated three turns) and that the pulse signal $S_1$ is output at the timing after the time length of four pulses of the rotation detection signal d plus the pulse $P_0$ of the photoconductor encode signal e from the instructions to write the electrostatic latent image in accordance with the yellow data.

In the above mentioned printing operation, the control board clears a conveyor encoder counter for counting the pulses of the second conveyor encode signal l output from the second encoder 2317 and after that during the time length of $(t_1+t_2+t_3')$ when the conveyor belt drive motor 2315 is rotated in the forward direction, the counter counts up one increment number for every pulse which rises from the second conveyor encode signal l. Note that the number of pulses output from the first encoder 2316 is $Pt_2$ before the first pulse of the second conveyor encode signal l is detected.

After that, a time length of $t_1$ later, the transfer operation is started. As mentioned before, during this time length, the pulse number Pp of the photoconductor encode signal e output from the encoder 2116 is equal to the pulse number $Pt_1$ of the first conveyor motor encode signal k output from the first encoder 2316.

The main control board 251 instructs the servo control board 253 to output a pulse signal $R_1$ to drive the conveyor belt drive motor 2315 to rotate in the reverse direction at a timing that the trailing edge of the record paper comes to a point which is a distance $l_2$ forward from the transfer point T. In accordance with the instructions, the conveyor belt 231 starts to move in the reverse direction (arrow Vr) at a timing after a time $t_3'$ from the timing that the pulse $R_1$ is output. Also, the conveyor belt motor encoder counter starts counting down at a timing that the second conveyor encode signal l output from the second encoder 2317 falls.

When the count number of the counter becomes zero, the record paper comes to a point where the rising part of the first pulse of the second encode signal l is detected when the conveyor belt drive motor is rotated in the forward direction. Therefore, the conveyor belt drive motor 2315 is stopped.

After that, the conveyor belt drive motor 2315 is again driven to rotate in the forward direction so that the counter counts up one increment when a rising portion of the second conveyor encode signal l is detected. After that, when the pulse number of the first conveyor motor encode signal k becomes $Pt_3$, the conveyor belt drive motor 2315 is deenergized. Note that the pulse number of the first conveyor motor encode signal k is a hundred times larger than that of the second conveyor motor encode signal l. Therefore, the pulse number $Pt_3$ is set as a number which is smaller than one hundred and corresponds to the pulse number $Pt_2$ which is output from the first encoder 2316 during the time between the output point of the pulse $S_1$ and the rising point of the first pulse of the second conveyor motor encode signal l in such a way that $(Pt_2+Pt_3)$ is maintained constant.

In accordance with the arrangement mentioned above, it becomes possible to eliminate the backlash of the conveyor belt 231 and guarantee the stable angular position of the second encoder 2317.

After that, a time $t_4$ later, the leading edge of the magenta toner image comes to a point Ts which is a distance $l_1$ prior to the transfer point T. At this timing, the pulse $S_2$ is output to instruct the servo control board 253 to drive the conveyor drive motor 2315 to rotate in the forward direction and start counting up the counter by the rising portion of the second conveyor motor encode signal l.

After the pulse $S_2$ is output, a time $t_1$ later, the pulse number of the photoconductor encode signal e which is output from the encoder 2116 becomes Pp. The magenta toner image and the record paper are positioned at a predetermined relative position with respect to each other by controlling the conveyor drive motor 2315 in such a way that the pulse number $Pt_1'$ of the first conveyor encode signal k becomes constant in the period of the time $t_1$ which signal is output from the first encoder 2316 and which pulse number is equal to $Pt_1 - Pt_2 - Pt_3$ After that, the control operation mentioned above is repeated.

By controlling the conveyor belt 231 in such a way mentioned above, it becomes possible to accurately position the leading edge of the record paper at the transfer point T at a timing after a time $t_1$ later from the time when the main control board 251 outputs the pulses $S_1$, $S_2$, $S_3$ and $S_4$, respectively.

As mentioned above, in accordance with the color copying apparatus of the present invention, the conveyor belt 231 starts the forward motion thereof at a timing that each of the forward rotation start pulses $S_1$, $S_2$, $S_3$ and $S_4$ are output wherein the timing of the start pulses is determined on the basis of the timing that the image writing operation is started in accordance with each of the yellow data, the magenta data, the cyanogen data and the black data, respectively, so as to set the timing that the forward motion of the conveyor belt 231 is started after the photoconductor drive roller 2111 is rotated. Therefore, the distance that the photoconductor belt 211 moves during the period from the time to start the image writing operation to the time to start the forward motion of the conveyor belt 231 can be maintained stable and constant irrespective of adverse influences from the unstable rotation of the photoconductor drive motor 2115 and the deformation of the photoconductor drive roller 2311, the unstable rotation of the motor and the deformation of the roller actually being inevitable from the stand point of mechanical structure thereof.

At the timing to start the forward motion of the conveyor belt 231, the record paper is positioned at a point that is a predetermined distance $l_1$ prior to the transfer point T in which the distance $l_1$ is equal to the distance that the leading edge of the toner image formed on the photoconductor belt 211 moves from the position thereof at that timing to the transfer point T. Also, the distance $l_1$ is very short in comparison to the distance from the image writing point E on the photoconductor belt 211 to the transfer point T. Therefore, even if the start of the forward motion of the conveyor belt 231 is offset from the rotary motion of the photoconductor belt 211, the adverse influence therefrom can be minimized.

In addition to that, in accordance with the above mentioned embodiment of the present invention, the position of the conveyor belt 231 is controlled by detecting the rotation of the conveyor drive roller 2311, which makes it possible to obtain a clear color copy without misalignment of different colors.

Note that the above mentioned pulse rate of each encoder and the timing for actuating each part of the copying apparatus are examples for realizing the present invention and do not limit the structure of the present invention. For example, if an encoder having a different pulse rate is to be used, it is possible to control the apparatus in the same manner as mentioned above by using a primary map for the pulse rate of each encoder used in the above mentioned embodiment.

Also, in accordance with the above mentioned embodiment of the present invention, the timing to start the forward motion of the conveyor belt 231 is determined on the basis of the timing to start the image writing operation in accordance with each of the yellow, magenta, cyanogen and black data, in which the pulse period of the rotation detection signal d is compensated for by the pulses of the photoconductor encode signal e so that the timing of the transfer operation is controlled on the basis of the time period of four pulses of the former signal plus Po pulses of the latter signal. However, if the pulse width of the compensation pulse is relatively small in comparison to the pulse interval of the rotation detection signal d, for example if the former is one third or less of the latter, the distance that the photoconductor belt 211 moves corresponding to the compensation pulses is very short in comparison to the distance from the image writing point E to the transfer point T. Therefore, it is practically possible to obviate the problem of misalignment of the different color images by controlling the each operation timing on the basis of, for example, a reference clock provided within the main control board 251 instead of the photoconductor encode signal e.

Also, the above mentioned embodiment of the present invention refers to a laser printer type color copying apparatus. However, the present invention is not limited to this type of copying apparatus. It is clear that the present invention can be applied to various kinds of image recording apparatus such as a color copying apparatus which comprises an ordinary optical scanning system for exposing the photoconductor, a color printer which forms a color hard copy from RGB signal transmitted from a TV camera or a TV set, and an image processing device which forms a multicolored image by overlapping a plurality of different color images.

As mentioned above, in accordance with the embodiment of the present invention, the forward motion of the record medium and the electrostatic latent image writing operation are fixedly synchronized with each other in such a way that the timing to start the forward conveying motion of the record medium is determined on the basis of the timing to start the image writing operation to form the latent image on the photoconductor. In accordance with the arrangement mentioned above, it becomes possible to minimize the adverse influences from the unstable movement of the mechanical parts of the apparatus and the deformation or dimensional errors of the parts, which are actually inevitable from the stand point of manufacturing accuracy of the apparatus, since the reference on which the controlling operation is based is renewed each time carrying out the image transferring operation for each of the different color toner images so that a clear color image is obtained from a plurality of different color toner images by overlapping the different color images on the record paper without misalignment between the different color images.

Also, as mentioned before, in accordance with the embodiment of the present invention, the copying apparatus comprises a first encoder 2316 having a high pulse rate, i.e., a short pulse interval with respect to the distance that the paper conveyor belt 231 moves and a second encoder 2317 having a low pulse rate. The first and second encoders are connected to the transfer drive roller (paper conveyor drive roller) 2311 so that the position of the paper conveyor belt 231 is controlled in accordance with the output signal of the second encoder 2317 which is compensated for by the output signal of the first encoder 2316. In accordance with this arrangement, it becomes possible to accurately control the position of the paper conveyor belt without being adversely influenced by outer noise or disturbance.

Also, in the backward movement of the record paper, the paper conveyor belt (transfer belt) 231 is slightly shifted forward after the count number of the transfer counter becomes zero. This makes it possible to remove the backlash of the movable structure of the copying apparatus. The conveyor belt is driven to move forward beyond the timing that the second transfer encode signal (conveyor belt encode signal) rises so that the belt does not stop at a position where the detection signal of the second encoder 2317 becomes unstable. This makes it possible to avoid count errors. Besides, the pulse number is arranged in such a way that the pulse number $Pt_2$ which is output from the first encoder 2316 during the period from the timing that the pulse $S_1$ rises to the timing that the first pulse of the second encode signal 1 rises plus the pulse number $Pt_3$ which is output in the slight forward motion of the conveyor belt 231 for removing the backlash is maintained constant. This makes it possible to control the position of the conveyor belt 231 substantially only by the second encode signal 1 in the second and subsequent copying operations for different colors, which increases the reliability of the control function.

In accordance with the above mentioned arrangement, it becomes possible to substantially obviate the problem of misalignment of different color images transferred on the record paper by reciprocating the paper in the forward and backward directions.

Besides, in accordance with the above mentioned embodiment of the present invention, the timing of the forward motion of the conveyor belt 231 is set from the rotation of the photoconductor drive roller 2111 on the basis of the timing to start the image writing operation in accordance with each of the yellow, magenta, cyanogen and black color data. That is, the timing that the forward rotation start pulses $S_1$, $S_2$, $S_3$ and $S_4$ are determined on the basis of the timing of starting the latent image forming process of the yellow, magenta, cyanogen and black color images, respectively. By this arrangement, the distance that the photoconductor belt 211 moves from the timing of starting the image writing operation to the timing of starting the forward motion of the conveyor belt 231 is always maintained constant irrespective of unstable rotation of the photoconductor drive motor 2115 and the deformation of the photoconductor drive roller 2311, in spite of that the problems of the unstable rotation and the deformation or dimensional errors are inevitable due to that the mechanical accuracy is limited. Therefore, it becomes possible to obviate the problem of misalignment of the different color toner images transferred on the record paper caused by that the distance that the photoconductor belt moves differs from the distance that the conveyor belt moves. Accordingly, a clear color copy can be obtained.

Figure 6:
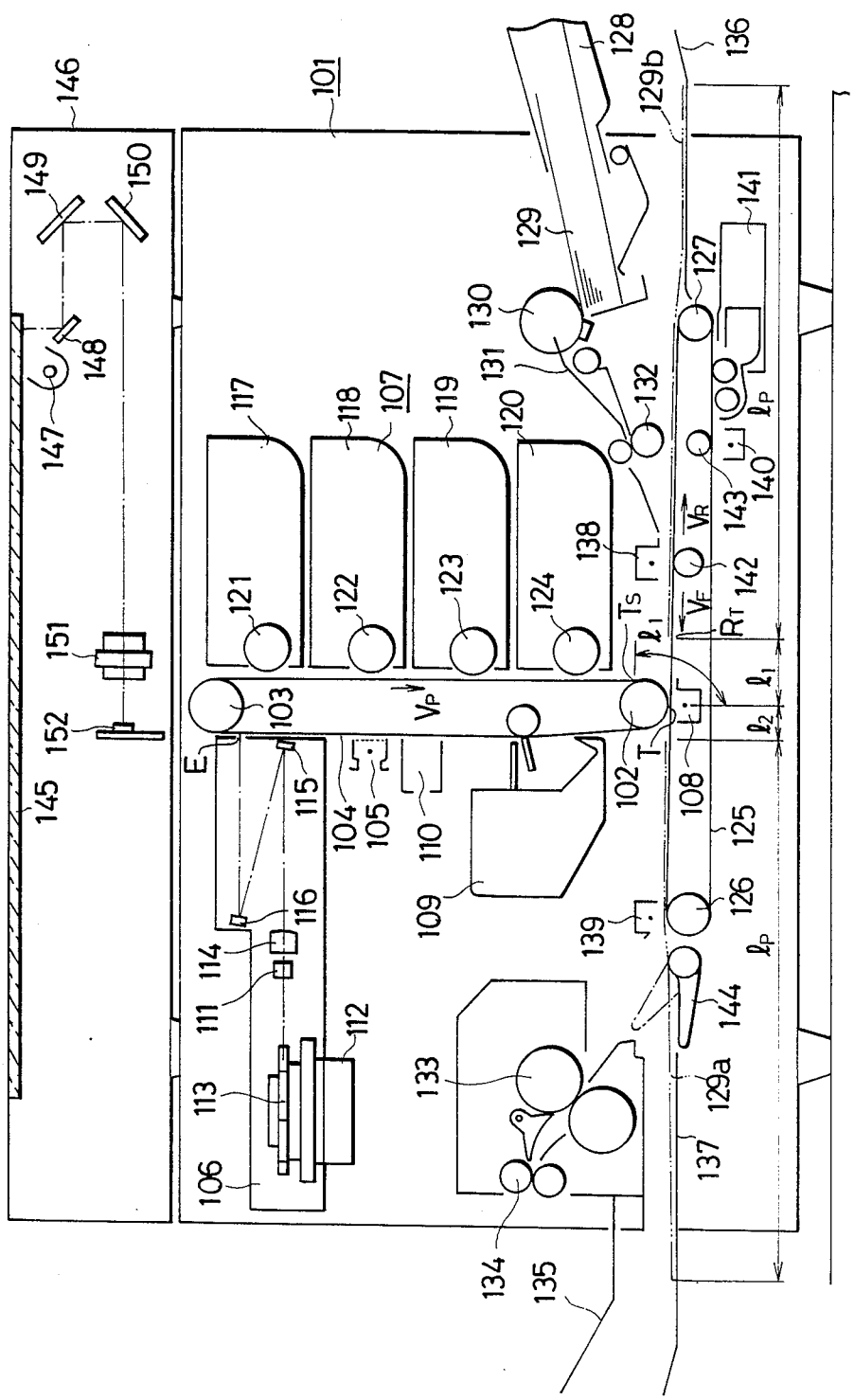
FIG. 6 is a vertical sectional view of the entire structure of the color copying apparatus of FIG. 5.

Another embodiment of the present invention is described hereinafter with reference to the drawings. FIG. 6 illustrates an example of the construction of the color record apparatus in accordance with the present invention. An endless photoconductor belt 104 is wound around and spans vertically between a drive roller 102 and a follower roller 103 in an apparatus body 101 at about a center portion thereof. The photoconductor belt 104 is driven to rotate in the clockwise direction by the rotation of the drive roller 102. Around this photoconductor belt 104 are disposed, in accordance with the electrophotographic process, an electrostatic charger 105, a photo writing unit 106, a development unit 107, a transfer device 108, a belt cleaner 109 and a static eliminator 110 in this order.

The photo writing unit 106 is constructed as a laser scanner comprising: a semiconductor laser device 111 which emits a laser beam which is modulated by a writing signal; a rotary polygon mirror 113 which is driven by a motor 112 to rotate so as to scan the photoconductor belt surface by the laser beam; a lens system 114 comprising an $f_\theta$ lens; and a pair of mirrors 115 and 116 for guiding the scanning laser beam to a latent image forming position E of the photoconductor belt. Another type of the laser device such as an LED array and an LCD array may be used instead of the semiconductor laser device.

Also, the development device 107 is the one for full color and comprises a yellow development device 117, a magenta development device 118, a cyanogen development device 119 and a black development device 120, disposed vertically in this order. Each development device can be selectively used. Each of the development devices 117, 118, 119 and 120 comprises a development sleeve 121, 122, 123 or 124 which is movable toward and away from the photoconductor belt 104 to contact with and discontact from the belt.

Also, a transfer belt (or referred to as conveyor belt) 125 is disposed under the photoconductor belt 104 as a means for conveying a record paper. The paper conveyor belt 125 is made from a dielectric material. The conveyor belt is wound around and spans horizontally between a drive roller 126 and a follower roller 127. The drive roller is rotatable in a forward direction and in a backward direction and selectively driven to rotate in one of the directions. A paper feed system is disposed on the upper side of the conveyor belt at the right end portion thereof. The paper feed system comprises a paper cassette 128 in which a stack of record papers 129 is housed. A paper is picked and fed from the cassette onto the paper conveyor belt 125 through a paper feed roller 130, a paper guide 131 and a resist roller 132. Also, a fixing and discharge system is disposed on the paper conveyor belt 125 at the left end portion thereof. The fixing and discharge system comprises a fixing unit (a pair of heating rollers) 133 and a pair of discharge rollers 134 for discharging the record paper into a paper stacker tray 135. A paper leading end guide plate 137 is disposed horizontally on the left side of the conveyor belt 125 aligning with an extension of the conveying line of the conveyor belt. Also, a guide plate 136 for guiding a trailing end of the record paper is disposed similarly on the right side of the conveyor belt 125. There are disposed around the conveyor belt 125: a paper attracting charger device 138 for electrostatically attracting and holding the record paper on the conveyor belt; a paper separation charger device 139 for separating the record paper from the surface of the conveyor belt and disposed above the drive roller 126; a static elimination corona device 140; and a belt cleaner 141. Also, an up down roller 142 is disposed inside of the conveyor belt at a position facing the paper attraction charger device 138. The up down roller 142 can be shifted upward and downward to change the position of the conveyor belt between an upper position where the conveyor belt 125 contacts with the photoconductor belt 104 and a lower position where the conveyor belt is discontacted from the photoconductor belt. This up down roller 142 also serves as a counter electrode of the paper attraction charger device 138 so that the structure of the apparatus is simplified. Numeral 143 designates a counter electrode of the static elimination corona device 140.

Also, a change lever 144 is disposed at the left end of the conveyor belt 125 to change the passage of the record paper between a direction to the fixing device 133 and a direction to the leading end guide plate 137.

Further, a color image reading device 146 is disposed on the apparatus body 101. The color image reading device 146 scans and reads an image of an original (not shown) placed on a contact glass 145. This color image reading device 146 is constructed as a digital scanner comprising an exposure lamp 147, a mirror 148, 149 and 150, an optical lens 151 and a CCD 152. The scanner also comprises a color separation filter (not shown) for separating the original color image into the color components R, G and B.

FIG. 5 illustrates a construction for driving and controlling the photoconductor belt 104 and the paper conveyor belt 125. The driving structure comprises a first drive motor (referred to as OPC motor below) 160 for rotating a drive roller 102 of the photoconductor belt 104 and a second driver motor (referred to as transfer motor below) 161 for rotating a drive roller 126 of the conveyor belt 125 in a forward direction and a backward direction. The OPC motor 160 and the transfer motor 161 are servo controlled by a main control board 164 which comprises a CPU, a RAM, an I/O device and a counter etc. through servo control boards 162 and 163. The OPC motor 160 comprises a shaft on which a disc 165 having a cut away 165a is secured. A photointerrupter 166 is disposed for detecting the cut away 165a of the disc 165 so as to constitute an one turn detection sensor 167 for detecting pulse signals each generated for every one revolution of the drive roller 102 which pulses are transmitted to the main control board 164 to control the functional timing of the apparatus. An encoder 168 is secured to the shaft of the OPC motor 160 and another encoder 169 is secured to the shaft of the transfer motor 161 so that the pulse signals from the encoders are transmitted to the servo control boards 162 and 163, respectively.

Figure 7:
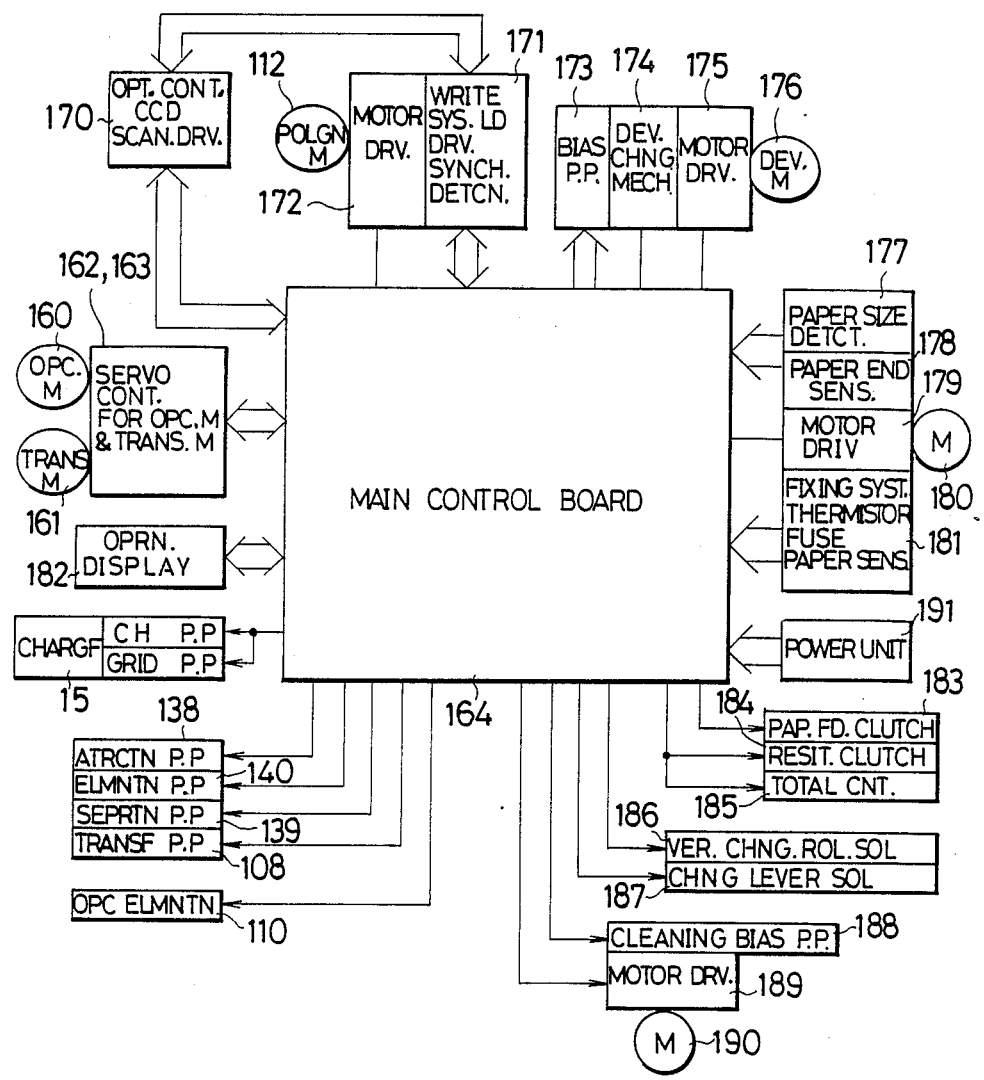
FIG. 7 is a block diagram of a control system of the color copying apparatus of FIG. 5.

FIG. 7 illustrates a whole structure of the control system including the main control board disposed in the center thereof. The OPC motor 160 and the transfer motor 161 are connected to the main control board 164 through the servo control board 162 and 163, respectively, as mentioned above. Numeral 170 designates an optical system control circuit for controlling the CCD and the scanner of the color image reading device 146. Numeral 171 designates a writing system control board for controlling the semiconductor laser drive circuit and the synchronization detection circuit of the photo writing unit 106. Numeral 172 designates a motor driver for the polygon mirror motor 112. The control system also comprises: a bias voltage source 173 for the development unit 107; a development device change means 174; a motor driver 175 for the development motor 176; a paper size detection sensor 177 disposed on the paper feed system for detecting the size of the record paper from the cassette 128 so as to control the timing of the operation of the apparatus in accordance with the paper size; a paper end sensor 178 which detects a state that the record paper cassette is empty; a motor driver 179 for a fixing roller drive motor 180; a thermistor 181; a thermal fuse; and a paper discharging sensor. Further, the control system comprises: an operation and display panel 182; a paper feed clutch 183; a resist clutch 184; a total counter 185; a vertical solenoid 187 for shifting the change lever 144; a cleaning bias power source 188; a motor driver 189 for a cleaning motor 190; and a power source unit 191.

The function of the above mentioned control system is described below with reference to the timing chart of FIG. 8. First, a print start switch is pushed so that a print start pulse signal is output as represented by line a of the timing chart, whereby the photoconductor belt 104 is rotated in the clockwise direction at a constant speed $V_p$ through the drive roller 102 which is driven by the OPC motor 160. Simultaneously with this motion, the transfer motor 161 is driven by an ON-OFF signal for driving the motor and a start signal for rotation of the transfer motor in the forward direction as represented by lines g and h, respectively, at a speed as represented by line j in the timing chart so that the transfer belt 125 is rotated in the forward direction (leftward with respect to the upper belt) at a speed of Vf through the drive roller 126 which rotates in the counterclockwise direction. The motors 160 and 161 are controlled in such a way that the speed $V_p$ equal to the speed Vf, that is, the photoconductor belt 104 moves at the same speed as the paper conveyor belt 125.

On the other hand, electrostatic charge on the photoconductor belt 104 is eliminated by the static eliminator 110 and the belt surface is evenly and electrostatically charged by the charger unit 105. This charging process is carried out in the following manner. The photoconductor belt surface is precleaned by the belt cleaner 109 so that the toner attached thereon is removed therefrom before the static charge elimination process is carried out. The static eliminator 110 applies a light or a corona onto the photoconductor belt surface so that the voltage of the surface becomes zero. After that, the entire surface of the photoconductor belt is evenly charged by the electrostatic charger unit 105 so that it becomes possible to form a latent image thereon by charging the surface in accordance with the image data. The toner is electrostatically attracted and attached to the portion where the electrostatic charge is not applied, when a negative-positive process is adopted. When the electrostatic charger unit 105 applies a corona to the photoconductor belt surface, a small amount of ozone is generated due to the electric discharge function. Although such an ozone is dissolved in a short time after the electric discharge process is stopped, it may adversely influence upon the toner image on the photoconductor belt surface and degrade the clearness of the toner image. Therefore, it is necessary to provide a fan to blow or suck the air around the charger unit to avoid the adverse influence from the ozone.

Figure 8:
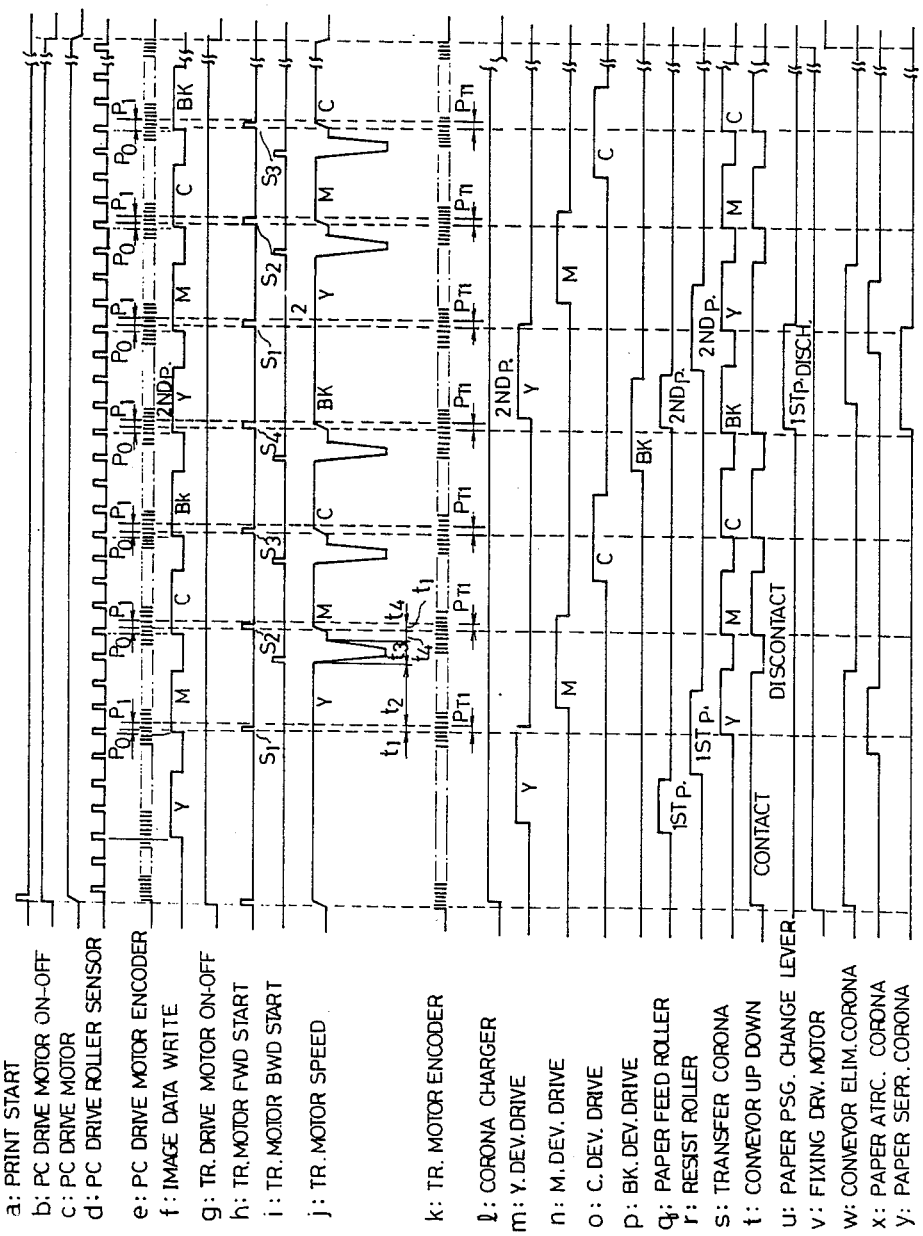
FIG. 8 is a timing chart of each component of the control system of FIG. 7.

The one rotation detection sensor 167 is mounted on the shaft of the drive roller 102 for the photoconductor belt 104 so that a detection pulse is generated for each turn of the drive roller 102 as represented by line d of the timing chart of FIG. 8. In accordance with this particular embodiment of the present invention, the photo writing unit 106 is controlled in such a way that the semiconductor laser 111 is started to operate at a timing that the third pulse is output from the sensor 167 so that the first writing operation to form an electrostatic latent image in accordance with the yellow data is started.

The image data for writing the latent image for each color is obtained from the color image reading device 146 in such a way that the color of the original color image is separated to three color components R, G and B which are detected by the CCD 152 and undergo an image calculation process on the basis of the intensity of each color component so as to obtain the color data for yellow, magenta, cyanogen and black, respectively. It is obvious that the color image data is not limited to the one mentioned above but it is possible to use any color data output from an outer color image processing system such as a color facsimile device, a word processor or a personal computer. If such an outer image processor is to be used, an interface circuit is provided between the outer processor and the recording apparatus.

With regard to the development unit for visualizing the electrostatic latent image, each of the development roller 121, 122, 123 and 124 of the development devices 117, 118, 119 and 120, respectively, is discontacted from the surface of the photoconductor belt 104 when the latent image is not positioned at each development roller. When the electrostatic latent image for a color comes to the corresponding development device for the color, the development device is urged to move leftward in FIG. 6 for a short time between shortly before and shortly after the timing that the latent image passes the point of the development roller so that the development roller comes in contact with the photoconductor belt 104. Also, the development unit is controlled in such a way that only the development device which the corresponding latent image comes in contact with is operated while the other development devices are not in operation as represented by lines m, n, o and p, respectively, in the timing chart of FIG. 8. In this particular embodiment, since the yellow latent image is firstly formed, the yellow development device 117 is firstly driven to operate to develop the latent image by the yellow toner carried on the development roller 121 which is shifted to come in contact with the photoconductor belt 104, as represented by line m of the timing chart of FIG. 8.

After that, a transfer process is carried out. As mentioned before, the change roller 142 is disposed for changing the vertical position of the paper conveyor belt 125 at the transfer position (drive roller 102) so as to contact the conveyor belt with the photoconductor belt and discontact the conveyor belt from the photoconductor belt. First, when the printing operation is started, the paper conveyor belt 125 is driven to move in the forward direction as represented by the leftward arrow (Vf). After that, the change roller 142 is shifted upward to the upper position so that the paper conveyor belt 125 comes in contact with the photoconductor belt 104 as represented by line t of the timing chart of FIG. 8. A record paper 129 is taken out from the cassette in accordance with a predetermined timing by the feeding roller 130. After that, the record paper is fed onto the conveyor belt 125 through the resist roller 132 in accordance with the timing so that the paper covers the color image developed on the photoconductor belt 104. The record paper 129 is electrostatically attracted and secured to the conveyor surface by applying a corona charge of a predetermined polarity by the paper attraction charger device 138 as represented by line x of the timing chart of FIG. 8 so as to prevent the paper from moving on the conveyor belt relative thereto. Note that the electrostatic charge on the conveyor belt 125 is eliminated evenly by the static elimination corona charging device 140 before the first transfer operation is started as represented by line w in the timing chart of FIG. 8. Also, the conveyor belt 125 is cleaned by the belt cleaner 140 before starting the transfer process for the first color toner image.

At the timing that the leading edge of the visualized yellow color image comes to a point Ts which is a predetermined distance away from the transfer point T, the transfer drive motor start signal $S_1$ for starting the forward rotation of the motor is input to the control circuit 163 for the transfer motor 161 as represented by line h in the timing chart of FIG. 8. Note that the motor simply continues to rotate in the forward direction since the motor is being rotated in the forward direction at the timing that the signal $S_1$ is generated as represented by line j in the timing chart of FIG. 8. At the timing of the signal $S_1$, the leading edge of the record paper actually comes to the point Ts which is a distance $l_1$ prior to the transfer point T. This corresponds to the time of four turns of drive roller 102 for the photoconductor belt 104 plus Po pulses from the encoder 168 for the OPC motor 160 after the timing of starting the yellow image writing operation as can be seen from the lines d, e, f and h in the timing chart of FIG. 8.

On the other hand, during this time period, the photoconductor belt 104 is moved the distance which corresponds to that from the point E which is the image writing position to the above mentioned point Ts.

A time $t_1$, later after the timing of $S_1$, the leading edge of the yellow color image moves the distance $l_1$ as well as the leading edge of the record paper so that the both edges simultaneously come to the transfer point T where the yellow color image is transferred from the photoconductor belt to the record paper on the conveyor belt by the function of the transfer corona charger 108. During this period of time $t_1$, the number of pulses output from the encoder 168 for the OPC motor 160 is $P_1$ whereas the number of pulses output from the encoder 169 for the transfer motor 161 is $P_{T1}$ as represented by lines e and k in the timing chart of FIG. 8. The pulse numbers $P_1$ and $P_{T1}$ depend on the distance of movement of the photoconductor belt 104 for one pulse and that of the paper conveyor belt 125 for one pulse, respectively. Therefore, if the distance of movement of the photoconductor belt 104 for one pulse is equal to that of the paper conveyor belt 125 for one pulse, the pulse number $P_1$ becomes equal to the pulse number $P_{T1}$. Whereas if the ratio of the distance of movement for the two belts is $\alpha$, the pulse numbers $P_1$ and $P_{T1}$ become values which correspond to $\alpha$. The following description of the particular embodiment of the present invention is on the condition that $P_1$ is equal to $P_{T1}$.

After a while, according as the transfer process for the yellow toner image proceeds, the leading edge of the record paper 129 is separated from the conveyor belt 125 and passes beyond the change lever 144 which is situated at the position depicted by a solid line in FIG. 6 onto the paper leading edge guide plate 137. When the yellow image transfer process further proceeds, at a timing that the trailing edge of the record paper 129 moves the distance $l_2$ beyond the transfer point T, that is a timing that the record paper moves the distance $(l_1+l_p+l_2)$ after the timing of $S_1$ wherein $l_p$ designates the length of the record paper, the transfer motor 161 is driven to rotate in the backward direction by the conveyor motor reverse rotation signal as represented by lines i and j in the timing chart of FIG. 8. At this moment, the time is $t_1+t_2$ and the record paper is at a position depicted by a dash-two-dot line in FIG. 6. Note that prior to this reverse rotation of the transfer motor 161, the change roller 142 is shifted downward so that the conveyor belt 125 is discontacted from the photoconductor belt 104.

By the reverse rotation of the transfer motor (conveyor belt drive motor), the transfer belt (paper conveyor belt) 125 and the record paper 129 are moved backward in the rightward direction at a speed Vr. The speed Vr is set to be faster than the speed Vf of the forward motion of the conveyor belt. Therefore, the conveyor belt can quickly return to the initial position, which makes it possible to heighten the copying speed of the switch back type copying system over the transfer drum type copying system. The time $t_3$ required for the return movement is far shorter than the time $t_1+t_2$ required for the forward movement.

In this backward motion of the conveyor belt, the rear end of the record paper (right end in the drawing) is separated from the conveyor belt 125 and proceeds onto the rear end guide plate 136. At a timing that the front end of the record paper comes back to the point $R_T$, as illustrated by a dash-two-dot line and designated by numeral 129b in FIG. 6, the backward motion of the conveyor is stopped to wait for the subsequent transfer process for the magenta toner image for a time $t_4$.

On the other hand, with regard to the photoconductor belt 104, the second latent image forming process in accordance with the magenta data begins before the preceding first process for the yellow color is finished. More precisely, the electrostatic latent image forming process by the semiconductor laser 111 controlled in accordance with the magenta image data is started at a timing that the photoconductor belt drive roller 102 is rotated four turns in this particular embodiment after the timing that the yellow image writing process is started as represented by lines d and f in the timing chart of FIG. 8.

With regard to the function of the development unit in this process, first, only the yellow development device 117 is driven to contact with the yellow image area of the photoconductor belt to develop the latent image by the yellow toner. After that, before the magenta image area comes to the yellow development device, the yellow development device is shifted away from the photoconductor belt surface and stops the operation thereof. After that, instead of the yellow development device, the magenta development device 118 is driven to move to the photoconductor belt and comes in contact therewith at a timing after the yellow image area passes the magenta development device and before the magenta image area comes to the magenta development device as represented by line n in the timing chart of FIG. 8, so that only the magenta image area is developed by the magenta toner.

After that, the start signal $S_2$ for driving the transfer drive motor to rotate in the forward direction is input to the drive control circuit 163 at a timing that the leading edge of the magenta image comes to the point Ts. This timing is the same as in the case for the above mentioned yellow image, that is, the timing that the drive roller 102 is rotated four turns plus the encoder 168 outputs Po pulses after the timing that the magenta image writing operation is started. Simultaneously with inputting the start signal $S_2$ to the control circuit 163 at the timing mentioned above or slightly after this timing, the vertical position change roller 142 is shifted to the upper position so that the paper conveyor belt 125 comes in contact with the photoconductor belt 104 before the leading edge of the record paper 129 comes to the transfer point T.

A time $t_1$ later after the timing of $S_2$, like in the case for the yellow image mentioned before, the pulse number output from the encoder 168 becomes $P_1$ and the photoconductor belt 104 moves the distance $l_1$. In this period of time $t_1$, the speed of the record paper 129 is risen from zero to Vf ($=V_p$). Also, the position of the photoconductor belt 104 and the position of the conveyor belt 125 are controlled in such a way that the pulse number $P_1$ which corresponds to the photoconductor belt position is equalized to the pulse number $P_{T1}$ which corresponds to the conveyor belt position, as in the case for the yellow image processing operation.

In accordance with this controlling arrangement, the leading edge of the record paper 129 moves the distance $l_1$ so that the yellow image of the preceding process and the magenta image of the subsequent process are precisely aligned and overlapped on the record paper 129.

After that, similar processes as mentioned above are repeated for the cyanogen image and the black image. That is, the copying apparatus carries out the following processes in order, i.e., a magenta image transfer process, a record paper quick return process, a cyanogen image writing process, a cyanogen image development process, a cyanogen image transfer process, a record paper quick return process, a black image writing process, a black image development process and a black image transfer process.

As can be seen from the explanation mentioned above, the timing to write the optical image for each different color at the laser irradiation point E is controlled to synchronized with the rotation of the drive roller 102 for the photoconductor belt 104 in accordance with the value (one cycle of the drive roller 102)×(number of rotation), which makes it possible to avoid the positional misalignment between the different color images on the record paper, thus the error in overlapping the different colors is avoided. In other words, even if the velocity of the photoconductor belt 104 is unstable and changed (fluctuation being equivalent to a whole number of rotation of the drive roller 102), the positional error in overlapping the different colors can be avoided since the velocity change pattern is the same for each of the different color images during the exposure process and the transfer process. More precisely, in the example of FIG. 8, the timing to write an optical image is controlled on the basis of the number of pulses detected by the one revolution detection sensor 167 in such a way that the image writing process is started at every four revolutions of the drive roller 102. Also, the OPC motor 160 and the transfer motor 161, respectively, are controlled in the same manner in such a way that the rotational positions of the two motors are detected by the respective encoders 168 and 169 which output pulses corresponding to the revolution of the motor and controlled on the basis of the respective pulse numbers $P_1$ and $P_{T1}$. Therefore, the different color images are precisely aligned with each other.

Processes after the black image transferring operation are carried out in a manner as follows. When the black image transferring operation is started, the change lever 144 is shifted to the upper position depicted by the dash dot line in FIG. 6 so that the record paper 129 is guided to the fixing device 133 after electrostatically eliminated by the static eliminator 139 so that the paper is separated from the conveyor surface from the leading edge thereof. The transfer motor 161 continues to rotate in the forward direction even after the trailing portion of the image is transferred to the record paper. Therefore, the record paper 129 is conveyed further leftward and discharged out of the apparatus onto the paper tray through the discharge roller 134 after the color image is fixed by the fixing device 133. The timing of this operational sequence is controlled in accordance with the lines j, u, v and y in the timing chart of FIG. 8. In this operation, the conveyor belt 125 is evenly eliminated electrostatically by the static elimination corona charger 140 which starts to apply the corona to the conveyor belt at a timing that the trailing end of the image area transferred to the first paper passes the static elimination corona charger 140, as represented by the line w in the timing chart of FIG. 8.

The above mentioned timing chart of FIG. 8 represents a copying operation in a repeat mode. In this operation mode, after the black image writing operation for the first paper is finished, the yellow image writing operation is started for the second record paper. Also, the above mentioned functional control operation for the record paper and the paper conveyor belt is repeated.

Note that the photoconductor belt 104 is cleaned by the belt cleaner 109 after the toner image formed thereon is transferred to the record paper so that the toner remaining on the belt surface is removed. After that, the electrostatic charge remaining on the photoconductor belt surface is eliminated by the static eliminator 110. After that, the photoconductor belt 104 is moved to the electrostatic charger unit 105.

Finally, when the last record paper is discharged into the paper tray and when the cleaning operation and the electrostatic elimination operation for the photoconductor belt and the conveyor belt are finished, the whole operation of the copying apparatus is ended and each part of the apparatus returns to the initial position.

In the embodiment of the copying apparatus mentioned above, the different color images are formed in the order of yellow, magenta, cyanogen and black and therefore the development devices are vertically disposed in the order of yellow, magenta, cyanogen and black from the above. However, the invention is not limited to this order of color images mentioned above. Also, in the embodiment mentioned above, each of the electrostatic latent images for a different color is formed in such a way that the image is optically written by the semiconductor laser 111 in accordance with the digitally processed image data for each color. However, instead of such a manner for forming the electrostatic latent image on the photoconductor surface, the latent image may be formed in a manner that an analogue optical image from an ordinary electrophotographic copying apparatus is imaged at the position E of the photoconductor belt in accordance with a predetermined timing so as to control the position of each different color image.

Also, in the above mentioned embodiment of the present invention, four different color images are repeatedly overlapped to form one multicolor image. However, the present invention is not limited to the four color overlapping arrangement. It is possible to repeat only two or three times for different color images by controlling the copying apparatus in such a way that the operation is ended after repeating any desired numbers of recording operations for different color images.

Also, it is possible to form a monochromatic image by using one desired development device to carry out the recording operation in a repeat mode in such a way that until the monochromatic image is copied on a desired number of record papers, the development device for the color is driven and being in contact with the photoconductor belt 104 as well as that the paper conveyor belt 125 is being in contact with the photoconductor belt 104 and that the paper passage change lever 144 is maintained in the upper position for guiding the paper to the fixing device 133.

Therefore, the recording speed can be heightened in the repeat mode operation to copy the image on a plurality of record papers in the monochromatic, or two or three color image overlappingly recording operation in comparison to that of the four color image overlappingly recording operation up to four thirds in the three color image overlappingly recording operation, twice in the two color image overlappingly recording operation and four times in the monochromatic recording operation.

Also, the colors of the developer toner are not limited to the above mentioned four colors, i.e., yellow, magenta, cyanogen and black. Any desired colors such as blue (B), green (G) and red (R) or a combination of those colors may be used to form one multicolored record image.

Figure 13:
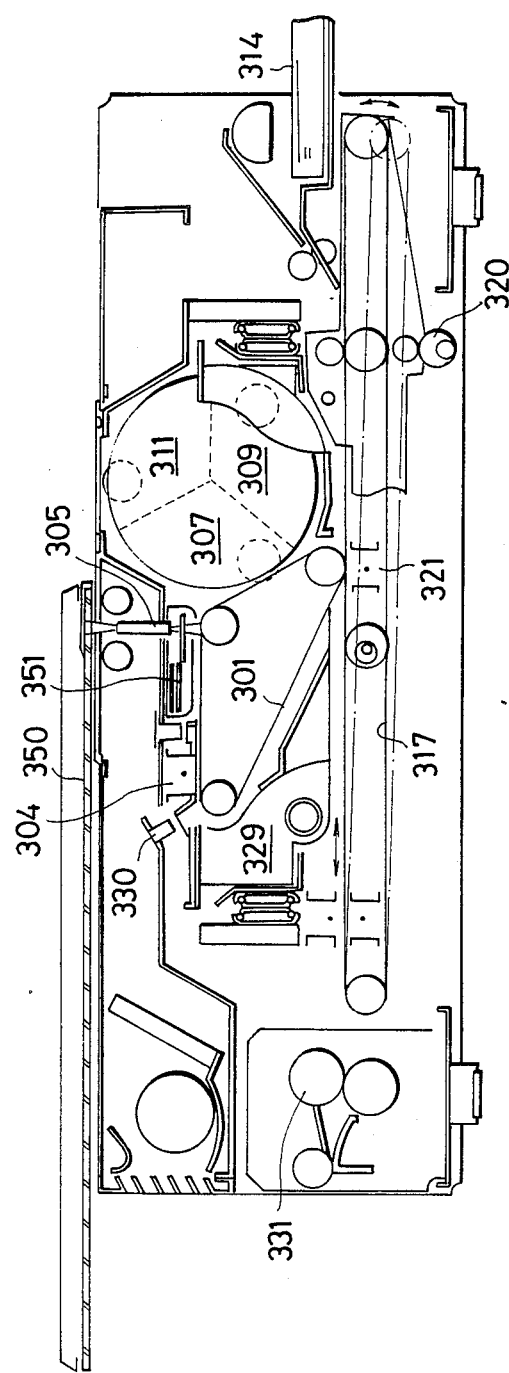
FIG. 13 is a vertical sectional view of a color copying apparatus in accordance with a related art which was proposed by the inventors of the present application before this application wherein a paper conveyor belt and an original support plate are driven to synchronize with each other by one drive means.

FIG. 13 illustrates a color printer in accordance with the related art which is used by the present inventors before the present invention was made. The color printer or a color copying apparatus illustrated in FIG. 13 comprises: a photoconductor belt 301 which is driven to move in one direction; an electrostatic charger 304; an image exposure device 305; a plurality of development devices 307, 309 and 311, which are selectively driven and comprise a different color developer (toner), respectively; a transferring charger 321; a cleaner 329; an electrostatic eliminator 330, wherein the constituents referred are disposed in this order around the photoconductor belt 301 along the direction of the movement thereof. The color copying apparatus also comprises a paper conveyor belt (transfer belt) 317 which carries a record paper electrostatically attracted and secured thereto and moves forward and backward. The record paper is fed from a paper feed portion 314 to the conveyor belt 317. The conveyor belt is vertically movable up and down at a transfer position where an image is transferred to the paper by the function of the transfer charger 321. The conveyor belt 317 is movable between an upper position where the conveyor belt 317 comes in contact with the photoconductor belt 301 and a lower position where the conveyor belt 317 is discontacted from the photoconductor belt 301. The conveyor belt 317 is driven to move toward and away from the photoconductor belt 301 by a drive means 320. The drive means 320 drives the conveyor belt 317 in such a way that in the forward conveying movement of the conveyor belt, the conveyor belt is shifted upward to come in contact with the photoconductor belt 301 so that a different color toner image is transferred from the photoconductor belt to the record paper carried on the conveyor belt and after that the coveyor belt is shifted downward to discontact from the photoconductor belt so that the conveyor belt is moved backward to return the record paper to the initial position for preparation to transfer the second color toner image to the paper overlapping on the first color toner image already transferred to the paper. By repeating the transferring operation for the plurality of different color toner images which are overlapped one above the other on the record paper, a multicolored image is formed on the record paper from the plurality of different color toner images. After the transferring operation is finished, the conveyor belt is moved forward to convey the record paper to the fixing device 331 where the color toner image transferred to the record paper is fixed to the paper at a time.

The color copying apparatus of FIG. 13 comprises an original support plate 350 which is driven to reciprocate in such a way that the original support plate on which an original to be copied is placed is moved in the direction opposite to that of the paper conveyor belt 317. The original is exposed in the forward motion of the support plate 350 so that the color of the original is separated to three color components through a color separation filter. The optical color images of the three colors, respectively are projected onto the photoconductor belt in sequence one after another through an optical exposure system 305 so as to write three electrostatic latent images on the photoconductor belt surface.

In accordance with this color copying apparatus mentioned above, it is necessary to synchronize the photoconductor belt 301, the paper conveyor belt 317 and the original support plate 350 with each other at a predetermined speed. Besides, it is also necessary to drive the photoconductor belt in one direction and to drive the paper conveyor belt and the original support plate in the direction opposite to each other.

Figure 14:
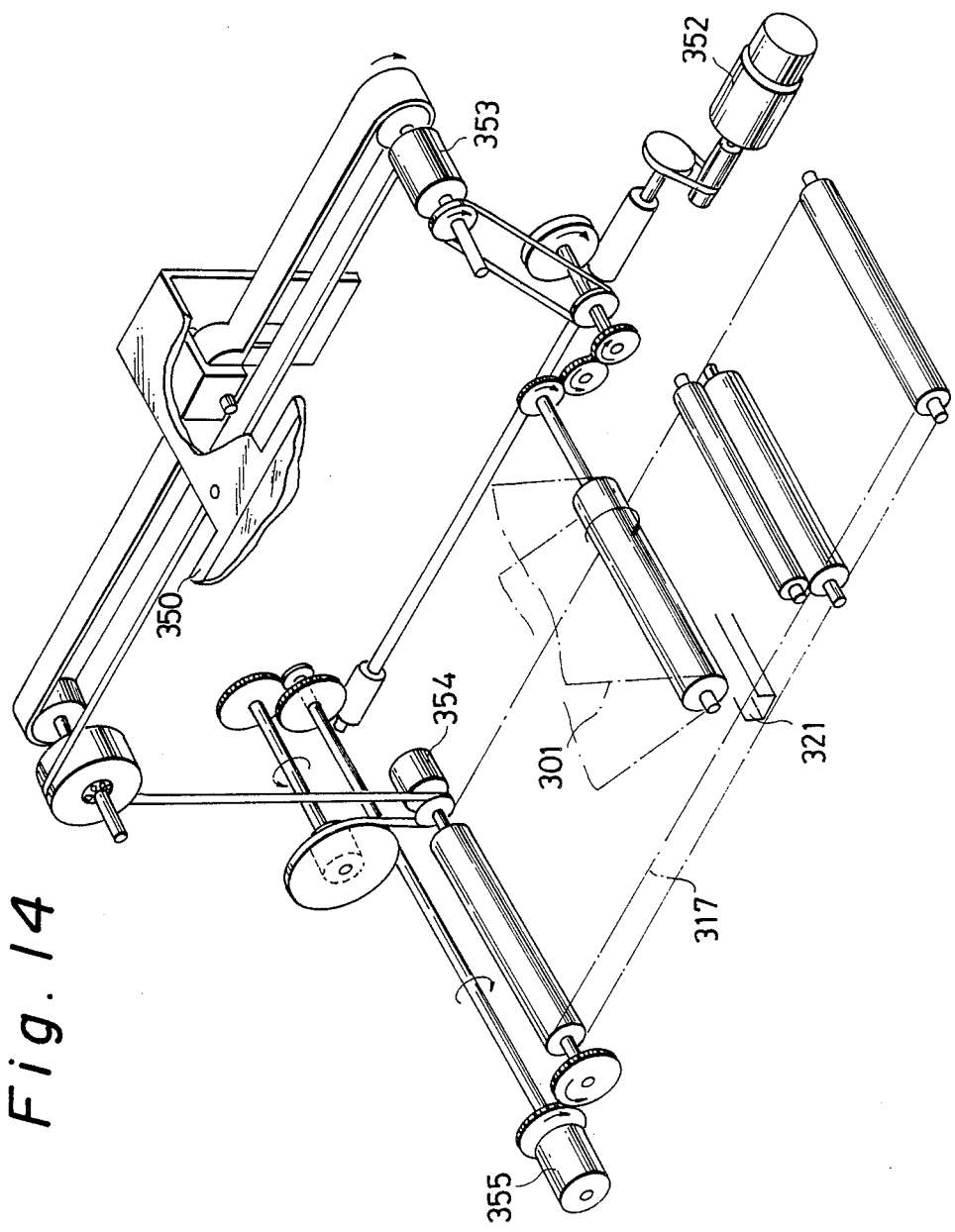
FIG. 14 is a perspective view of a drive system of the color copying apparatus of FIG. 13.

FIG. 14 illustrates a drive system for driving the above mentioned color copying apparatus which system is proposed by one of the inventors of the present invention. The drive system comprises a drive motor 352 which drives the photoconductor belt 301, the paper conveyor belt 317 and the original support plate 350 at a predetermined speed in a predetermined direction through a series of gears and a belt drive means illustrated in the drawing. In accordance with the proposed arrangement, it is possible to reliably synchronize the photoconductor belt 301, the paper conveyor belt 317 and the original support plate 350 with each other precisely at a desired speed in the predetermined direction so that it becomes possible to obtain a clear color copy without misalignment of the color components and jitter.

The above mentioned driving system is very advantageous from the stand point that by using one common drive source, the three color toner images are precisely aligned with each other on the record paper by almost completely synchronizing the photoconductor belt, the paper conveyor belt and the original support plate with each other in the color copying apparatus which forms a color image by separating the color of the original to a plurality of different colors to form a different color toner images on the photoconductor by directly irradiating the optical images of the separated different colors and overlapping the color toner images on the record paper to form a color toner image combined with the different color toner images. However, with regard to a color recording apparatus such as laser printer which comprises a photoelement such as a laser device, an LED and an LCD for writing the optical image by turning the photoelement on and off in accordance with an image data of the separated different color information, it is unnecessary to provide the synchronizing system for moving and synchronizing the original support plate which system is necessary for the above mentioned type of color copying apparatus. Therefore, it is rather convenient to use a respective drive means for each of the photoconductor belt and the paper conveyor belt instead of using a common drive means.

However, if the photoconductor belt and the paper conveyor belt are driven individually by a respective different drive means, a problem of jitter arises due to the difference of speed between the two belts since the speed of the belts fluctuates due to the fluctuation of the load applied upon the belts even though the two belts are driven in a servo controlled operation manner. Therefore, the fluctuation of the load must be minimized.

As mentioned before, the color recording apparatus to which the present invention is applied is constructed in such a manner that the paper conveyor belt is movable toward and away from the photoconductor belt to contact with and discontact from the photoconductor belt so that the toner image is transferred to the record paper in the forward motion of the paper conveyor belt wherein the conveyor belt is being in contact with the photoconductor belt, after that the paper conveyor belt is discontacted from the photoconductor belt and driven to move backward for preparation for transferring the second toner image on the record paper overlapping on the first toner image transferred on the paper. Then the paper conveyor belt is driven again to move forward at a timing so that the leading edge of the record paper comes to the transfer point at a same timing as the leading edge of the toner image on the photoconductor belt comes to the transfer point. Before the leading edge of the record paper comes to the transfer point, the paper conveyor belt is again shifted toward the photoconductor belt so as to come in contact therewith. In this operation, when the transfer charger is turned on while the photoconductor belt is moved at a constant speed, the paper conveyor belt and the photoconductor belt are electrostatically attracted to each other. In this case, if the paper conveyor belt is slower than the photoconductor belt, a deceleration force is applied to the photoconductor belt whereas an acceleration force is applied to the paper conveyor belt, which causes jitter and misalignment of the toner images from each other when the toner images of different colors, respectively are overlappingly transferred to the record paper to form one multicolored image on the paper. Especially, the color of line potions becomes different from the original color when the separated color components are misaligned with each other when transferred to the record paper. Also, the speed difference between the photoconductor belt and the paper conveyor belt causes slip and friction therebetween, which damages the photoconductor belt after the long use thereof.

Also, when three or four different color toner images are to be overlappingly transferred to the record paper, the toner images are misaligned from each other due to the relative position between the photoconductor belt and the paper conveyor belt is changed each time for transferring the different color toner image, even if the speed of the two belts is maintained same with each other for each transferring operation of the different color toner image.

The present invention obviates the above mentioned drawbacks of the related art of FIGS. 13 and 14.

A further embodiment of the present invention is described in detail below with reference to the drawings.

Figure 9:
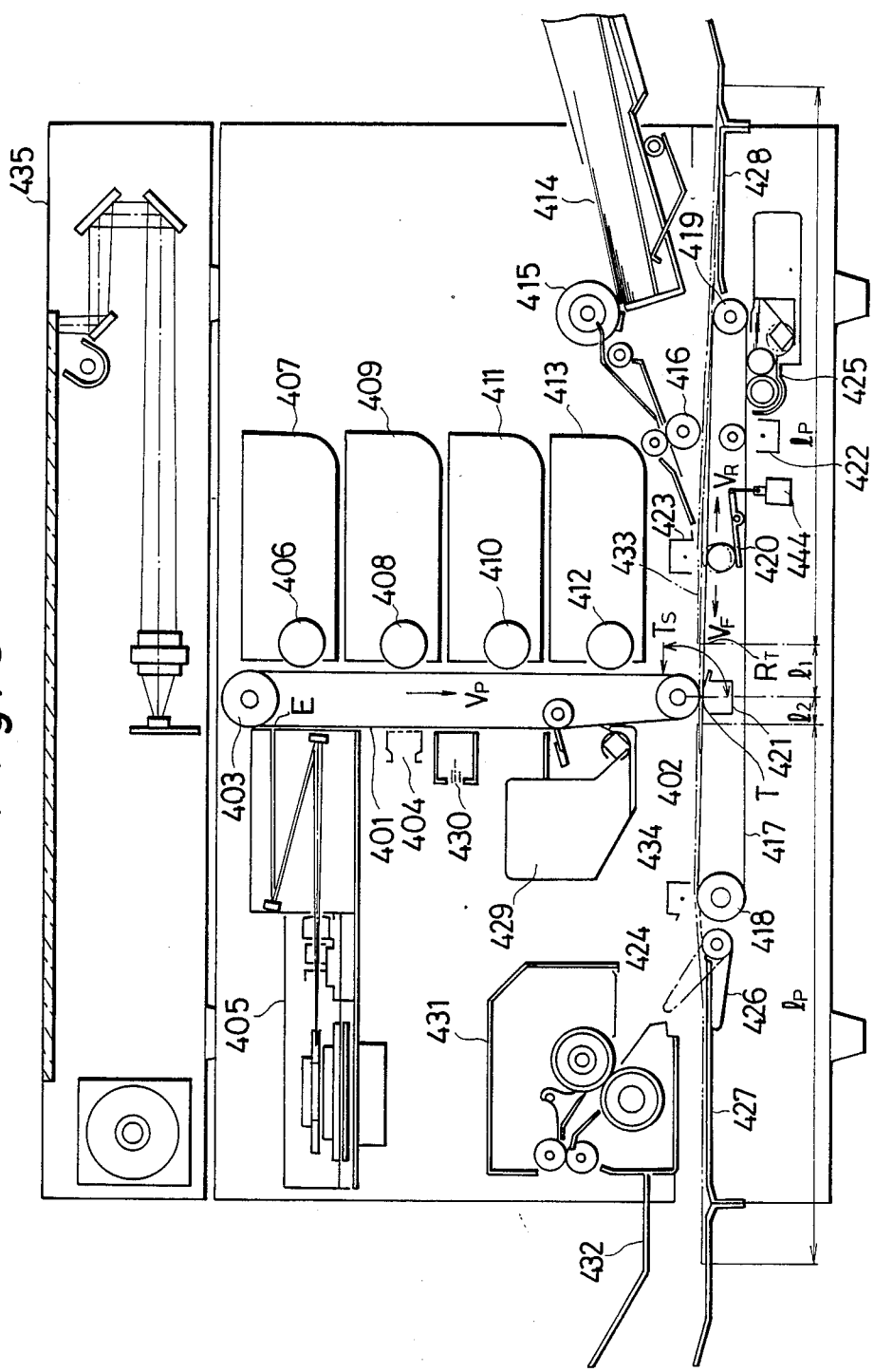
FIG. 9 is a vertical sectional view for representing a whole structure of a still another embodiment of the present invention.
Figure 10A:
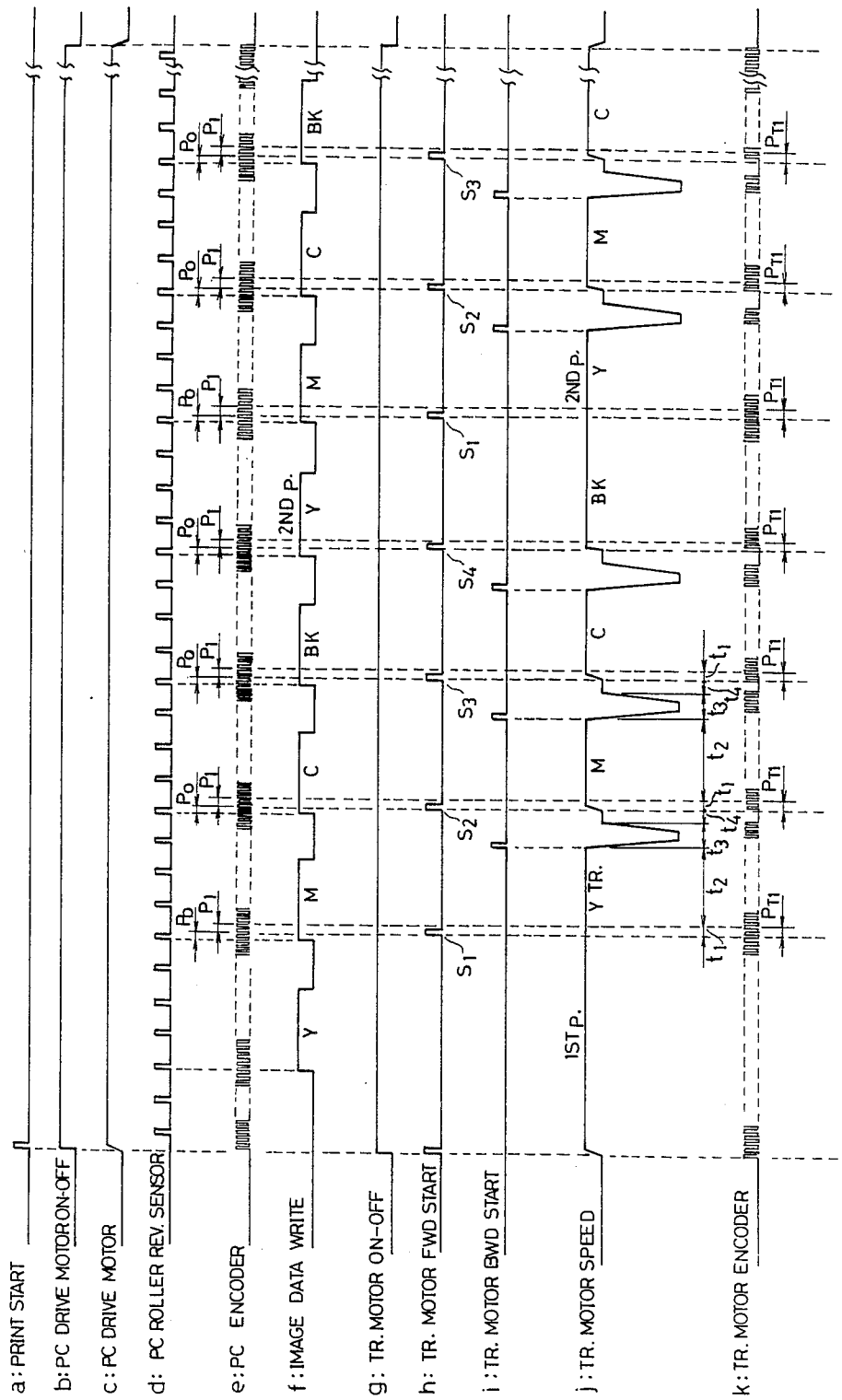

FIG. 9 is a constructional view of a whole structure of a color recording apparatus in accordance with the present invention. FIGS. 10a and 10b represent a timing chart of the essential function of the structure of FIG. 9. FIG. 11 is a block diagram of a drive control arrangement for the color recording apparatus of FIG. 9.

The construction and function of this embodiment of the present invention is described as follows.

When a print switch is turned on as represented by line a in the timing chart of FIG. 10a, a photoconductor belt 401 is driven to rotate in a clockwise direction at a speed of an arrow Vp by a photoconductor drive roller 402 which is driven by a photoconductor drive motor 436 (FIG. 11).

Also, simultaneously with this starting motion of the photoconductor belt, a record paper conveyor belt (transfer belt) 417 is driven to rotate in a forward direction (leftward arrow) at a speed VF by a conveyor belt drive motor 439 which is driven to rotate in a forward direction as represented by signal lines g and h and a speed line j in the timing chart of FIG. 10a. Note that the speed of the photoconductor belt and that of the paper conveyor belt are controlled so that the speed Vp is equal to the speed VF.

The photoconductor belt 401 is first electrostatically eliminated by a static eliminator 430 and after that electrostatically charged evenly over the entire surface thereof by an electrostatic charger 404 under the condition as follows.

(1) The photoconductor belt surface is precleaned by a cleaning device so that the toner is removed therefrom. After that, the static eliminator applies an optical beam or a corona charge on the photoconductor belt surface so that the voltage of the photoconductor belt surface becomes substantially zero.

(2) If the copying operation is to be carried out by a negative positive process, toner is electrostatically attracted and attached to the portion where the photoconductor belt surface is not charged. The photoconductor belt surface must be evenly charged by the electrostatic charger.

(3) The electrostatic charger generates a small amount of ozone when applying the corona charge to the photoconductor belt. This ozone is resolved in a short time when the corona charge is stopped. However, the ozone may adversely influence the photoconductor belt surface so that the image formed thereon is degraded. Therefore, the ozone is removed from around the charger device (not shown) by blowing air to the charger or evacuating air around the charger by using a fan.

A revolution detection sensor 438 is attached to the shaft of the photoconductor belt drive roller 402 so that a pulse is output each time the drive roller rotates one turn as represented by line b in the timing chart of FIG. 10a.

In accordance with the example of FIGS. 10a and 10b, the semiconductor laser diode of the photo writing unit is started to operate at a timing that a third pulse from the photoconductor belt drive roller is detected by the one turn revolution sensor 438 so that an electrostatic latent image is optically written in accordance with the yellow image data, first. Note that the optical writing means is not limited to the semiconductor laser diode but it is possible to use any type of optical writing means such as an LED (light emitting diode) array, an LCD (liquid crystal device) array or any semiconductor devices of another type.

The image data is obtained in such a way that, first, a color image reader 435 disposed on the upper portion of the copying apparatus of FIG. 9 separates the color of the original to be copied to for example three colors, i.e., blue, green and red, and detects the intensity of each color. The image data for each color is calculated from the detected information of the intensity of the three colors so that the color data for yellow, magenta, cyanogen and black are obtained.

On the other hand, it is possible to use any other color data output from another color image processing system such as a color facsimile, a word processor or a personal computer through an interface circuit device to introduce the color data to the copying apparatus of the invention.

With regard to the development devices 407, 409, 411 and 413 for visualizing the electrostatic latent image, the development rollers 406, 408, 410 and 412 thereof are usually discontacted from the photoconductor belt surface.

Each of the development rollers is urged leftward in FIG. 9 to come in contact with the photoconductor belt surface during the time shortly before and shortly after the timing that the corresponding latent image passes the corresponding development roller.

Also, only the development device which comes in contact with the photoconductor belt starts the developing operation thereof as represented by lines m to p in the timing chart of FIG. 10b.

First, the yellow latent image which is firstly written on the photoconductor belt is developed by shifting the yellow development device leftward to come in contact with the photoconductor belt at a predetermined timing so that the developing operation by the yellow toner can be taken place as represented by line m in the timing chart of FIG. 10b.

After that, a transfer process is carried out. The paper conveyor belt 417 is so constructed that the conveyor belt can be contacted with and discontacted from the photoconductor belt surface at the transfer point where the photoconductor belt drive roller is disposed by the function of a shift roller 420 which is driven to move up and down by a solenoid.

As mentioned above, when the printing operation is started, the paper conveyor belt 417 is driven to move in the forward direction (leftward arrow). After that, the change roller 420 for changing the vertical position of the paper conveyor belt is shifted to the upper position so that the paper conveyor belt comes in contact with the photoconductor belt 401 as represented by line t in the timing chart of FIG. 10b.

On the other hand, an uppermost record paper 414 is taken from the stack of the papers by the paper feed roller 415 and transferred onto the conveyor belt through the resist roller 416 at a predetermined timing so that the toner image developed on the photoconductor belt surface meets with the record paper at the transfer point.

The record paper fed onto the paper conveyor belt is electrostatically attracted and secured to the conveyor belt surface by applying a corona charge having a predetermined polarity by the paper attracting electrostatic charger 423 as represented by line x in the timing chart of FIG. 10b so that the record paper does not move with respect to the conveyor belt during the transfer operation. The vertical shift roller 420 for changing the position of the conveyor belt mentioned above is used as a counter electrode for the paper attracting electrostatic charger 423, which makes it possible to simplify the structure of the copying apparatus. Note that the paper conveyor belt is electrostatically eliminated evenly on the entire surface thereof prior to the first transfer process for developing the yellow image by the static elimination corona charger 422 as represented by line w in the timing chart of FIG. 10b. Also, the paper conveyor belt surface is cleaned by the conveyor belt cleaner 425 so that the toner attached on the belt surface is removed therefrom.

At a timing that the leading edge of the visualized yellow image comes to a point Ts which is a predetermined distance prior to the transfer point T, a start signal $S_1$ for driving the paper conveyor belt drive motor in the forward direction is input to the drive control circuit 443 for controlling the paper conveyor belt drive motor 439 as represented by line h in the timing chart of FIG. 10a.

Note that the paper conveyor belt driven motor 439 is already started to rotate in the forward direction at the timing of $S_1$, therefore, the conveyor belt drive motor 439 simply continues the rotation movement thereof when the start signal S1 is applied as represented by line j in the timing chart of FIG. 10a. At the timing of $S_1$, the leading edge of the record paper comes to a point RT which is a predetermined distance $l_1$ prior to the transfer point T. Also, at this timing of $S_1$, the leading edge of the yellow toner image developed on the photoconductor belt comes to a point Ts which is a predetermined distance $l_1$ prior to the transfer point T.

To explain this timing more precisely with reference to the timing chart of FIG. 10a, the signal $S_1$ is output at a timing after the time that the photoconductor belt drive roller rotates four turns plus the time of the pulse number Po output from the photoconductor belt drive motor encoder after the yellow image writing operation is started as represented by lines d, e, f and h in the timing chart of FIG. 10a.

In this time period, the photoconductor belt moves a distance from the image writing point E to the above mentioned point Ts.

A time $t_1$ later after the timing of $S_1$, the leading edge of the yellow toner image and the leading edge of the record paper are moved the distance $l_1$ and come to the transfer point T where the yellow toner image is transferred to the record paper from the photoconductor belt by the transferring corona charger 421.

During this period of time $t_1$, the number of pulses output from the photoconductor drive motor encoder 437 (FIG. 11) is $P_1$ while the number of pulses output from the conveyor drive motor encoder 440 (FIG. 11) is $P_{T1}$ as represented by lines e and k in the timing chart of FIG. 10a. If the displacement of the photoconductor belt per one revolution of the encoder thereof is equal to that of the paper conveyor belt, the pulse number $P_1$ is equal to the pulse number $P_{T1}$, whereas if the ratio of the displacement of the photoconductor belt per one revolution of the encoder thereof to that of the paper conveyor belt is $a$, the pulse numbers $P_1$ and $P_{T1}$ correspond to the value $a$.

This particular embodiment of the present invention is explained on the condition that the pulse number $P_1$ is equal to the pulse number $P_{T1}$.

According as the transfer process for the yellow toner image is proceeded, the leading edge of the record paper is separated from the paper conveyor belt surface and moved to the paper forward end guide plate 427 passing beyond the paper passage change lever 426 which is in the position depicted by a solid line in FIG. 9.

When the yellow toner image transfer process is further proceeded and the trailing edge of the record paper moves a distance $l_2$, that is at a timing that a time $t_1$ plus $t_2$ later from the timing of $S_1$ when the record paper moves a distance $l_1+l_2+l_p$ (paper length) in the above time $t_1$ plus $t_2$, the paper conveyor belt drive motor is driven to rotate in the reverse direction by the reverse rotation signal as represented by lines i and j in the timing chart of FIG. 10a. At this moment, the record paper is at a position depicted by a dash-two-dot line 34 in FIG. 9.

Prior to starting the reverse rotation of the conveyor drive motor, the change roller 420 for changing the vertical position of the paper conveyor belt is shifted downward to the lower position so that the paper conveyor belt is discontacted from the photoconductor belt 401.

In this backward motion of the paper conveyor belt, the paper conveyor belt moves at a speed $V_R$ which is far faster than the speed $V_F$ to realize a quick return movement. That is, the paper conveyor belt moves the same distance in a short time $t_3$ in this quick return movement as in a time $t_1$ plus $t_2$ in the forward movement thereof, thus returning to the initial position to start the transfer operation.

In this quick return motion of the paper conveyor belt, the rear end of the record paper (right end in the drawing) is separated from the conveyor belt surface and proceeds toward the paper rear end guide plate 428. When the conveyor belt moves precisely back the predetermined distance so that the record paper is conveyed back to the position depicted by a dash-two-dot line 433 where the front end of the record paper (left end in the drawing) is positioned at the point $R_T$, the backward motion of the conveyor is stopped to wait there for the subsequent transfer process for transferring the magenta toner image for a time $t_4$.

On the other hand, with regard to the photoconductor belt 401, the magenta image writing operation is started while the yellow toner image transferring operation is being carried out at a timing that the photoconductor belt drive roller is rotated a predetermined whole number of turns, four turns in this particular embodiment, after the timing of starting the yellow image writing operation.

With respect to the development device, during the yellow toner transferring operation, only the yellow development device is driven and comes in contact with the photoconductor belt only in the region where the yellow toner image is developed. Before the magenta toner region comes to the yellow development device, the yellow development device is shifted away and discontacted from the photoconductor belt and ends its operation.

Instead of the yellow development device, the magenta development device 408 is shifted to come in contact with the photoconductor belt and starts its operation after the yellow toner image passes there and before the magenta latent image reaches there, as represented by line n in the timing chart of FIG. 10b, whereby the latent image is developed by the magenta toner of the magenta development device 408.

After that, a start signal $S_2$ for driving the paper conveyor drive motor to rotate in the forward direction is input to the drive control circuit 443 at a timing that the leading edge of the magenta toner image comes to the point Ts, i.e., a timing that the photoconductor belt drive roller is rotated four turns and the encoder of the photoconductor belt drive motor is rotated to output Po pulses after the timing of starting the magenta image writing operation, as in the case of transferring the yellow toner image mentioned above. By this operation, the paper conveyor belt 417 is started to move leftward.

Simultaneously with or shortly after the timing of $S_2$, a contact-discontact signal (line t in the timing chart of FIG. 10b) is output to energize the solenoid 444 to drive the up down roller 420 to shift to the upper position so that the paper conveyor belt comes in contact with the photoconductor belt before the leading edge of the record paper comes to the transfer point T. In this case, the paper conveyor belt is shifted to come in contact with the photoconductor belt after the speed of the paper conveyor belt becomes equal to that of the photoconductor belt.

A time $t_1$ later after the timing of $S_2$, the pulse number of the encoder of the photoconductor belt drive motor becomes $P_1$ and the photoconductor belt surface moves a distance $l_1$, as in the case of transferring the yellow toner image mentioned above.

Also, in the period of this time $t_1$, the speed of the record paper is risen from zero to $V_F(+V_P)$. Further, the rotation of the photoconductor belt drive motor is controlled in a manner that the above mentioned pulse number $P_1$ becomes equal to the pulse number $P_{T1}$ of the pulses output in the time $t_1$ after the timing of $S_1$ for transferring the yellow toner image.

In accordance with the controlling arrangement mentioned above, the leading edge of the record paper moves the distance $l_1$ in the period of time $t_1$ so that the magenta toner image is aligned with the preceding yellow toner image transferred on the record paper.

After that, similar processes as mentioned above are repeated for the cyanogen image and the black image. That is, the copying apparatus carries out the following processes in order, i.e., a magenta image transfer process, a record paper quick return process, a cyanogen image writing process, a cyanogen image development process, a cyanogen image transfer process, a record paper quick return process, a black image writing process, a black image development process and a black image transfer process.

Processes after the black image transferring operation are carries out in a manner as follows. When the black image transferring operation is started, the change lever 426 is shifted to the upper position depicted by the dash dot line in FIG. 9 so that the record paper is guided to the fixing device 431 after electrostatically eliminated by the static eliminator so that the paper is separated from the conveyor surface from the leading edge thereof. The transfer motor continues to rotate in the forward direction even after the trailing portion of the image is transferred to the record paper. Therefore, the record paper is conveyed further leftward and discharged out of the apparatus onto the paper tray through the discharger roller after the color image is fixed by the fixing device. The timing of this operational sequence is controlled in accordance with the lines j, u, v and y in the timing chart. In this operation, the conveyor belt 417 is evenly eliminated electrostatically by the static elimination corona charger which starts to apply the corona to the conveyor belt at a timing that the trailing end of the image area transferred to the first paper passes the static elimination corona charger 422, as represented by the line w in the timing chart of FIG. 10b.

The above mentioned timing chart of FIGS. 10a and 10b represents a copying operation in a repeat mode. In this operation mode, after the black image writing operation for the first paper is finished, the yellow image writing operation is started for the second record paper. Also, the above mentioned functional control operation for the record paper and the paper conveyor belt is repeated.

Note that the photoconductor belt 401 is cleaned by the belt cleaner 429 after the toner image formed thereon is transferred to the record paper so that the toner remaining on the belt surface is removed. After that, the electrostatic charge remaining on the photoconductor belt surface is eliminated by the static eliminator 430. After that, the photoconductor belt 401 is moved to the electrostatic charger unit 404.

Finally, when the last record paper is discharged into the paper tray and when the cleaning operation and the electrostatic elimination operation for the photoconductor belt and the conveyor belt are finished, the whole operation of the copying apparatus is ended and each part of the apparatus returns to the initial position.

In the embodiment of the copying apparatus mentioned above, the different color images are formed in the order of yellow, magenta, cyanogen and black and therefore the development devices are vertically disposed in the order of yellow, magenta, cyanogen and black from the above. However, the invention is not limited to this order of color images mentioned above. Also, in the embodiment mentioned above, each of the electrostatic latent images for a different color is formed in such a way that the image is optically written by the semiconductor laser diode in accordance with the digitally processed image data for each color. However, instead of such a manner for forming the electrostatic latent image on the photoconductor surface, the latent image may be formed in a manner that an analogue optical image from an ordinary electrophotographic copying apparatus is imaged at the position E of the photoconductor belt in accordance with a predetermined timing so as to control the position of each different color image.

Also, in the above mentioned embodiment of the present invention, four different color images are repeatedly overlapped to form one multicolor image. However, the present invention is not limited to the four color overlapping arrangement. It is possible to repeat only two or three times for different color images by controlling the copying apparatus in such a way that the operation is ended after repeating any desired numbers of recording operations for different color images.

Also, it is possible to form a monochromatic image by using one desired development device to carry out the recording operation in a repeat mode in such a way that until the monochromatic image is copied on a desired number of record papers, the development device for the color is driven and being in contact with the photoconductor belt as well as that the paper conveyor belt is being in contact with the photoconductor belt and that the paper passage change lever is maintained in the upper position for guiding the paper to the fixing device 431.

Therefore, the recording speed can be heightened in the repeat mode operation to copy the image on a plurality of record papers in the monochromatic, or two or three color image overlappingly recording operation in comparison to that of the four color image overlappingly recording operation up to four thirds in the three color image overlappingly recording operation, twice in the two color image overlappingly recording operation and four times in the monochromatic recording operation.

Also, the colors of the developer toner are not limited to the above mentioned four colors, i.e., yellow, magenta, cyanogen and black. Any desired colors such as blue (B), green (G) and red (R) or a combination of those colors may be used to form one multicolored record image.

Figure 12:
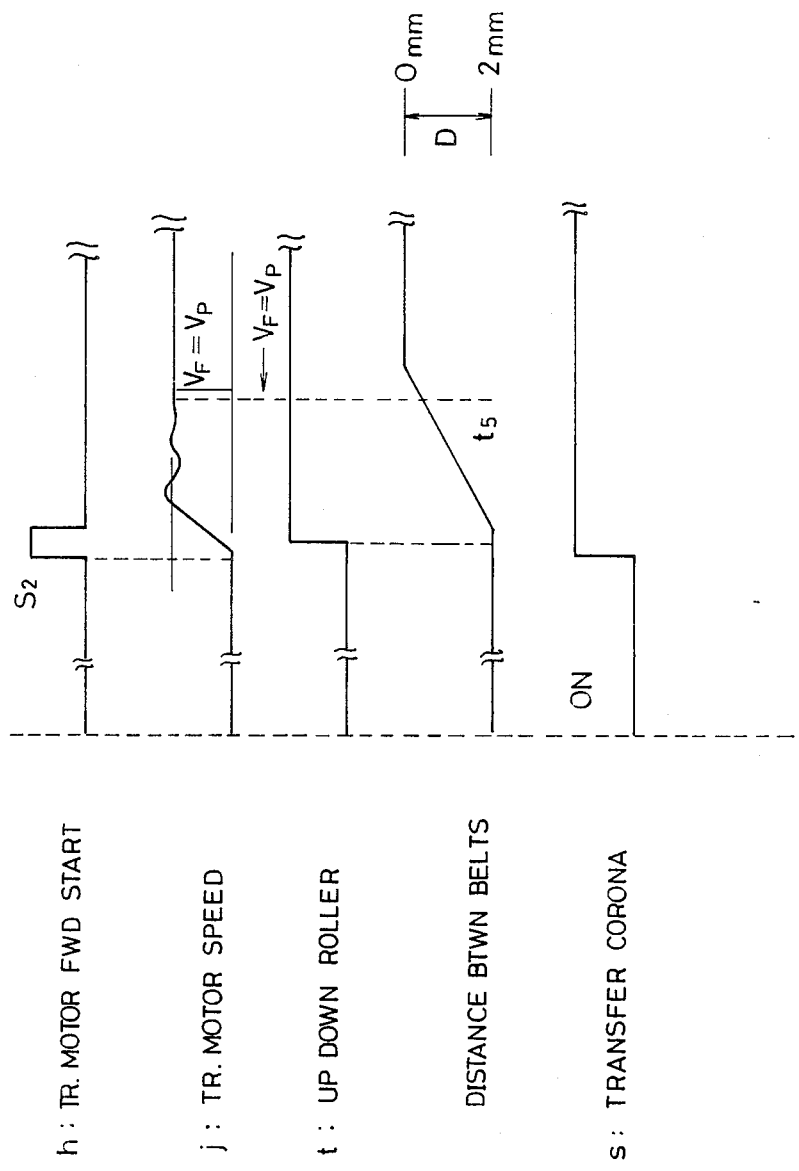
FIG. 12 is an enlarged timing chart representing a part of the timing charts of FIGS. 10a and 10b.

FIG. 12 represents an enlarged view of the lines h, j, t, and s of the timing chart of FIGS. 10a and 10b, showing around the timing of $S_2$ for starting the magenta image processing operation. FIG. 12 further represents the distance D between the paper conveyor belt and the photoconductor belt. As can be seen from this timing chart, the paper conveyor belt comes in contact with the photoconductor belt so that the distance therebetween becomes zero after the timing $t_5$ that the speed of the photoconductor belt $(V_p)$ and that of the paper conveyor belt $(V_F)$ are equalized to each other.

In connection with the size of the record paper, an explanation is made below with reference again to FIGS. 5 to 8. If the size of the record paper is changed from that of the paper depicted in the drawings, the paper size is detected by a paper size detection sensor 177 so that the main control board 164 discriminates the size of the record paper which is being used in the copying operation. The main control board 164 adjusts the timing cycle of writing the optical image which cycle synchronizes with the drive roller 102 in accordance with the paper size. For example, the main control board controls the timing of writing the optical image in such a way that when the record paper is smaller than the standard paper which is assumed to be the one depicted in the drawings, the optical image writing operation is started at every three turns of the drive roller 102, whereas when the record paper is larger than the standard paper, the optical image writing operation is started at every five turns of the drive roller. In accordance with such a control operation, it becomes possible to always start the image writing operation at a proper timing irrespective of the record paper size so that the misalignment of the images of the different colors can be avoided. Also, when a small size record paper is to be used, the image forming processes can be performed in a short time, thus heightening the image recording speed, since the processing speed can be changed in accordance with the record paper size so that the small paper can be processed with a minimum necessary time far shorter than in the case of processing large size record papers.

Many widely different embodiments of the present invention may be constructed without departing from the spirit and scope of the present invention. It should be understood that the present invention is not limited to the specific embodiments described in the specification, except as defined in the appended claims.

What is claimed is:

1. A color recording apparatus comprising:
   an electric charge carrier which is circulatingly movable;
   an electrostatic latent image forming means for forming an electrostatic latent image which corresponds to an original image on said electric charge carrier;
   a development means for developing said electrostatic latent image;
   a transfer means for transferring the developed image formed on said electric charge carrier to a record medium in a transfer process;
   a conveyor means for conveying the record medium forward and backward with respect to said transfer means; and
   a control means which carries out a series of control operations to control said electrostatic latent image forming means to form an electrostatic latent image on said electric charge carrier, to control said development means to develop said electrostatic latent image, to control said conveyor means to convey said record medium forward, to control said transfer means to transfer said developed image to said record medium, and to control said conveyor means to convey said record medium backward at least for one time; in which the control means repeats the control operations,
   wherein said control means controls said conveyor means prior to the transfer process in such a way that the record medium is positioned at a point which is a predetermined distance before a transfer point and that a forward movement of the record medium is started on the basis of an information of starting an electrostatic latent image forming operation each time the transfer process is carried out.

2. A color recording apparatus according to claim 1, wherein the apparatus further comprises a first signal generation means which outputs a first cyclic signal in response to the circular motion of said electric charge carrier, wherein said control means counts the number of signal waves of said first cyclic signal and sets a starting point each time to start the electrostatic latent image forming operation on the basis of the counted number of said first cyclic signal.

3. A color recording apparatus according to claim 2, wherein the apparatus further comprises a second signal generation means which outputs a second cyclic signal having a cycle shorter than that of said first cyclic signal in response to the circular motion of said electric charge carrier, wherein said control means compensates the cycle of said first cyclic signal by said second cyclic signal and sets a starting point to start the conveying motion of said record medium in the forward direction on the basis of the compensated first cyclic signal.

4. A color recording apparatus according to claim 1, wherein the apparatus further comprises a third signal generation means which outputs a third cyclic in response to the reciprocation movement of said conveyor means and a fourth signal generation means which outputs a fourth cyclic signal having a cycle shorter than that of said third signal to compensate for the cycle of said third cyclic signal and wherein said control means counts the numbers of the signal waves of said third signal and said fourth signal, respectively, and controls said conveyor means on the basis of the counted numbers of said third and fourth signals.

5. A color recording apparatus according to claim 4, wherein said control means controls the backward motion of said conveyor means in such a way that after the conveyor means is moved back, the conveyor means is slightly moved forward to a predetermined point a distance shorter than that which corresponds to one cycle of said third signal and positioned at said predetermined point.

6. A color recording apparatus according to claim 1, wherein the apparatus comprises:
one photoconductor;
an exposure means for exposing said photoconductor to form a plurality of electrostatic latent images on said photoconductor by projecting a plurality of optical images one after another each of which images corresponds to a color which is separated from the color of an original image to be recorded;
a development means for developing said electrostatic latent images in a different color, respectively;
a conveyor means for conveying a record paper forward and backward with respect to said photoconductor;
a transfer means for transferring the developed different color images on the record paper in such a way that the different color images are overlappingly transferred one above the other to the record paper so that one multicolored image is formed from the plurality of the different color images on the record paper;
a first drive means for driving to rotate said photoconductor;
a second drive means for driving to rotate said conveyor means forward and backward to reciprocate said conveyor means, provided individually other than said first drive means; and
a control means for controlling said first drive means and said second drive means as well as for positioning said photoconductor at a predetermined position in relation to the paper conveyor means in such a way that the speed of the backward movement of the record paper conveyed by the conveyor means is faster than that of the forward movement thereof.

7. A color recording apparatus according to claim 1, wherein the apparatus comprises:
an image carrier which is circulatingly movable in one direction;
an optical writing means for writing a latent image on said image carrier;
a plurality of development means each of which is selectively functionable for developing a corresponding one of said latent images in a different color;
a transfer means for transferring the developed image to a record medium;
a conveyor means for conveying said record medium forward and backward which means is shiftable toward and away from said image carrier between a contact position and a discontact position at a transfer portion where said transfer means is disposed;
an image carrier drive means for driving said image carrier;
a conveyor drive means for driving said conveyor means provided individually other than said image carrier drive means; and
a shift means for shifting said conveyor means to come in contact with and discontact from said image carrier at said transfer portion;
wherein in the forward movement of said conveyor means, said conveyor means is shifted to come in contact with said image carrier so that one color toner image is transferred to said record medium in every forward movement thereof, wherein in the backward movement of said conveyor means, the conveyor means is shifted away from said image carrier to discontact therefrom and moves back to a position where said record medium is positioned before said transfer portion to wait for the subsequent color toner image transferring operation in which a second color toner image is transferred to said record medium overlapping the preceding image of the first color transferred on said record medium,
wherein said shift means is controlled to drive said conveyor means in such a way that said conveyor means comes in contact with said image carrier after a timing that the speed of said conveyor means becomes equal to that of said image carrier.

8. A color recording apparatus according to claim 7, wherein said record medium is fed onto said conveyor means while said conveyor means is moved in the forward direction, wherein said conveyor means is moved backward each time after one color toner image is transferred to said record medium to the position where said record medium waits for the subsequent transfer operation, wherein from the subsequent second transfer operation, said conveyor means is controlled to start the forward motion thereof from this waiting state by a start timing signal which is output in response to the position of said image carrier, and wherein said conveyor means and said image carrier are controlled in such a way that, prior to a timing that the leading edge of said color toner image to be transferred and the leading edge of said record medium come to the transfer portion, the speed of the forward motion of said conveyor means and that of said image carrier become equal to those in the preceding transfer operation for the first color toner, respectively, as well as that the positional relationship between said conveyor means and said image carrier becomes equal to that in the preceding transfer operation for the first color toner image.

9. A color recording apparatus according to claim 1, wherein the apparatus comprises:

one photoconductor belt;

an exposure means for exposing the photoconductor belt to form electrostatic latent images on the photoconductor belt by projecting a plurality of optical different color images one after another the colors of which images are separated from the color of an original image to be recorded;

a development means for developing the latent images in a different color, respectively, by a respective different color developer;

a conveyor means for conveying a record paper forward and backward with respect to the photoconductor belt; and a transfer means for transferring the visualized different color images developed on the record paper in such a way that the different color images are transferred one above the other on the record paper to overlap each other so that one multicolored image is formed from the plurality of the different color images on the record paper, wherein the apparatus further comprises a timing control means which controls the timing of exposing the optical image to the photoconductor belt in such a way that the timing is synchronized with the rotation of the drive roller of the photoconductor belt so that the cycle time of the exposure operation is equal to a value of one cycle time of the drive roller multiplied by number of rotation and wherein the apparatus further comprises a timing varying means for varying the time of the cycle by the timing control means in accordance with the size of the record paper.

* * * * *